United States Patent
Takeda

(10) Patent No.: US 9,075,852 B2
(45) Date of Patent: Jul. 7, 2015

(54) SEARCH SYSTEM, INFORMATION PROCESSING DEVICE, METHOD FOR CONTROLLING INFORMATION PROCESSING DEVICE, PROGRAM, AND INFORMATION RECORDING MEDIUM

(75) Inventor: Seiichi Takeda, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/241,881

(22) PCT Filed: May 16, 2012

(86) PCT No.: PCT/JP2012/062510
§ 371 (c)(1),
(2), (4) Date: Feb. 27, 2014

(87) PCT Pub. No.: WO2013/031303
PCT Pub. Date: Mar. 7, 2013

(65) Prior Publication Data
US 2014/0214810 A1    Jul. 31, 2014

(30) Foreign Application Priority Data
Aug. 31, 2011    (JP) .................................. 2011-190122

(51) Int. Cl.
*G06F 17/30* (2006.01)
(52) U.S. Cl.
CPC .... *G06F 17/30554* (2013.01); *G06F 17/30867* (2013.01); *G06F 17/30395* (2013.01); *G06F 17/30327* (2013.01)
(58) Field of Classification Search
CPC .................... G06F 17/30991; G06F 17/30716; G06F 17/30719; G06F 17/30554; G06F 17/30651; G06F 17/30994
See application file for complete search history.

(56) References Cited

U.S. PATENT DOCUMENTS 5,546,529 A * 8/1996 Bowers et al. ................ 715/848
6,012,055 A * 1/2000 Campbell et al. .................... 1/1

(Continued)

FOREIGN PATENT DOCUMENTS

| JP | 2007-156788 A | 6/2007 |
| JP | 2009-217585 A | 9/2009 |
| JP | 2011-149977 A | 8/2011 |

OTHER PUBLICATIONS

"System for On-line Shopping with Salesclerk Agent" [online], Mar. 28, 2003, Japan Patent Office, [searched on Jul. 26, 2011] Internet URL: http://www.jpo.go.jp/shiryou/s_sonota/hyoujun_gijutsu/net_koukoku/050.html See Spec./Background Art for concise explanation of relevance.

(Continued)

*Primary Examiner* — Daniel Kinsaul
(74) *Attorney, Agent, or Firm* — Hubbs, Enatsky & Inoue PLLC

(57) ABSTRACT

To provide a search system for requesting a user to select any of a plurality of options and searching based on a result of selection by the user, capable of assisting the user so as to readily select an option. A selection screen display control unit (72) displays on a display unit a selection screen showing a plurality of lower node information items corresponding to a plurality of lower nodes positioned immediately below the current node in a tree structure in which a search condition and a node are correlated with each other. A search result screen display control unit (76) displays on the display unit a search result screen showing a list of information items satisfying a search condition corresponding to the nodes from the top node to the current node. In the selection screen, the selection screen display control unit (72) outputs, so as to be correlated to each of the plurality of lower node information items, a display concerning a list of information items satisfying a search condition corresponding to nodes from the top node to a lower node corresponding to the lower node information item.

23 Claims, 12 Drawing Sheets

(56) References Cited

U.S. PATENT DOCUMENTS

| | | | |
|---|---|---|---|
| 6,567,812 B1* | 5/2003 | Garrecht et al. | 707/708 |
| 7,627,599 B2* | 12/2009 | Heer et al. | 1/1 |
| 2002/0152222 A1* | 10/2002 | Holbrook | 707/104.1 |
| 2004/0243938 A1* | 12/2004 | Weise et al. | 715/526 |
| 2005/0010605 A1* | 1/2005 | Conrad et al. | 707/104.1 |
| 2006/0036581 A1* | 2/2006 | Chakrabarti et al. | 707/3 |
| 2007/0255702 A1* | 11/2007 | Orme | 707/5 |
| 2008/0134100 A1* | 6/2008 | Ferrari et al. | 715/854 |
| 2009/0234847 A1 | 9/2009 | Homma et al. | |
| 2009/0281991 A1* | 11/2009 | Huynh et al. | 707/3 |
| 2009/0299965 A1* | 12/2009 | Aziz et al. | 707/3 |
| 2010/0146012 A1* | 6/2010 | Beaudreau et al. | 707/803 |
| 2011/0202522 A1* | 8/2011 | Ciemiewicz et al. | 707/711 |
| 2011/0289460 A1* | 11/2011 | Dow et al. | 715/854 |
| 2012/0078954 A1* | 3/2012 | Araya | 707/769 |
| 2012/0096041 A1* | 4/2012 | Rao et al. | 707/794 |
| 2012/0297344 A1* | 11/2012 | Cohene et al. | 715/843 |

OTHER PUBLICATIONS

International Search Report for PCT/JP2012/062510 dated Jul. 31, 2012.

Written Opinion of the International Searching Authority for PCT/JP2012/062510 dated Jul. 31, 2012.

* cited by examiner

FIG.6

| NODE | SEARCH CONDITION |
|---|---|
| 1 | ----- |
| 1-1 | ----- |
| 1-1-1 | ----- |
| ... | ... |
| 1-1-2 | ----- |
| ... | ... |
| 1-1-3 | ----- |
| ... | ... |
| 1-2 | ----- |
| ... | ... |
| 1-3 | ----- |
| ... | ... |
| 2 | ----- |
| ... | ... |
| 3 | ----- |
| ... | ... |

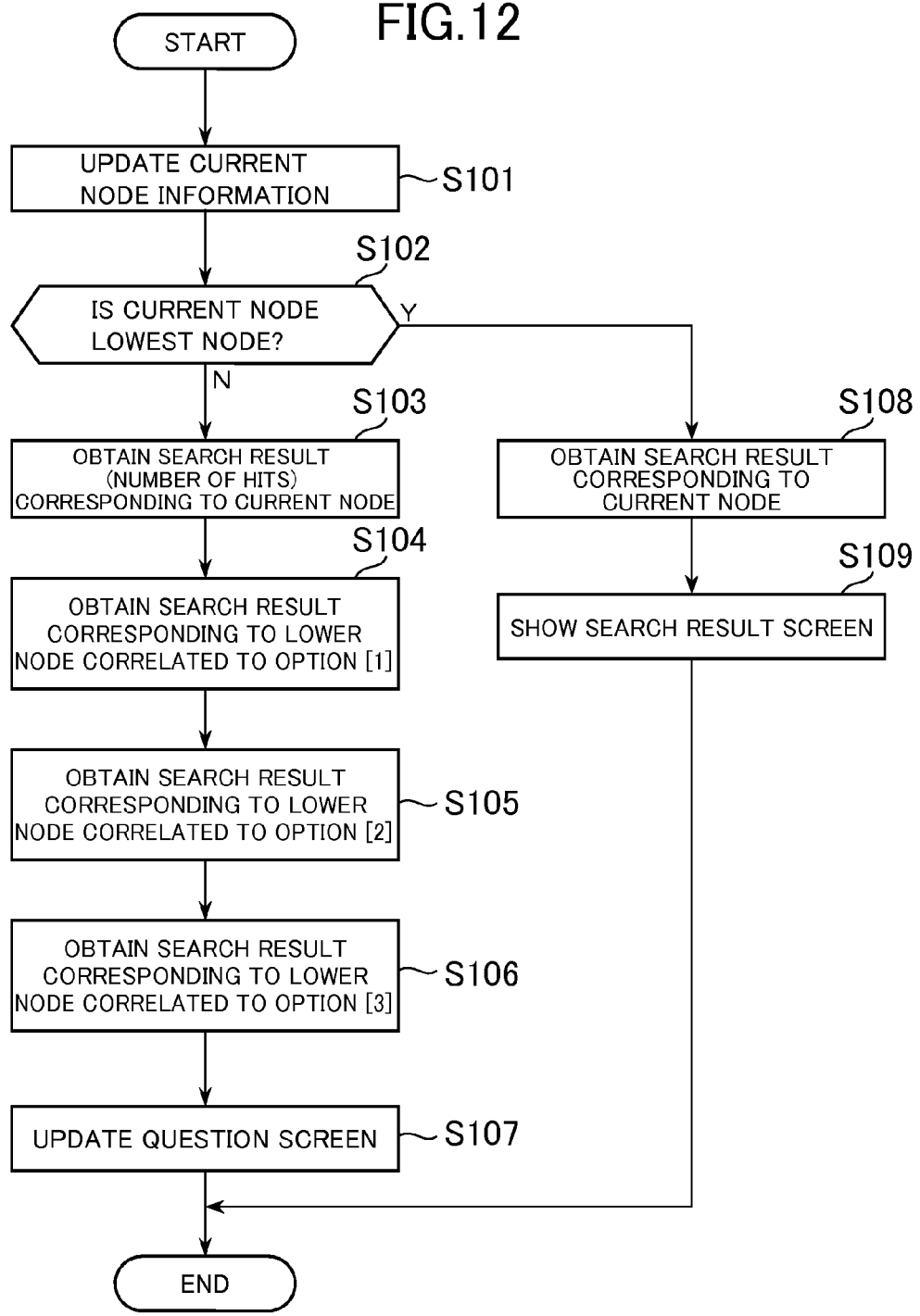

| PRODUCT ID | NAME | PRICE | CATEGORY | IMAGE | DISPLAY PRIORITY |
|---|---|---|---|---|---|
| G0001 | --- | --- | --- | --- | 1 |
| G0003 | --- | --- | --- | --- | 2 |
| G0010 | --- | --- | --- | --- | 2 |
| G0016 | --- | --- | --- | --- | 2 |
| G0020 | --- | --- | --- | --- | 1 |
| G0022 | --- | --- | --- | --- | 1 |
| ... | ... | ... | ... | ... | ... |

| | PRODUCT ID | NAME | PRICE | CATEGORY | IMAGE |
|---|---|---|---|---|---|
| (a) | G0001 | --- | --- | --- | --- |
| | G0020 | --- | --- | --- | --- |
| | G0022 | --- | --- | --- | --- |
| | ... | ... | ... | ... | ... |
| (b) | G0003 | --- | --- | --- | --- |
| | G0010 | --- | --- | --- | --- |
| | G0016 | --- | --- | --- | --- |
| | ... | ... | ... | ... | ... |

SEARCH SYSTEM, INFORMATION PROCESSING DEVICE, METHOD FOR CONTROLLING INFORMATION PROCESSING DEVICE, PROGRAM, AND INFORMATION RECORDING MEDIUM

CROSS REFERENCE TO RELATED APPLICATIONS

This application is a National Stage of International Application No. PCT/JP2012/062510 filed May 16, 2012, claiming priority based on Japanese Patent Application No.2011-190122 filed on Aug. 31, 2011. The contents of each of the above documents are incorporated herein by reference in their entirety.

TECHNICAL FIELD

The present invention relates to a search system, an information processing device, a method for controlling an information processing device, a program, and an information storage medium.

BACKGROUND ART

There has been known a system for presenting to a user a question and a plurality of options for selection as an answer to the question, and narrowing down information that is useful for the user, based on an answer of the user. For example Non-Patent Document 1 describes a system for presenting to a user a question and a plurality of options and narrowing down appropriate products, based on an answer of the user.

CITATION LIST

Non-Patent Literature

Non-Patent Literature 1: "System for On-line Shopping with Salesclerk Agent" [online], Mar. 28, 2003, Japan Patent Office, [searched on Jul. 26, 2011] Internet <URL: http://www.jpo.go.jp/shiryou/s_sonota/hyoujun_gijutsu/net_kouk oku/050.html>

SUMMARY OF INVENTION

Technical Problem

In the above described system, a user may not be able to decide which option to select in a case of some question or option. For example, the user may not be able to decide which option to select in a case where there is no option which the user wishes to select, or in a case where there are two or more options which the user wishes to select. Nevertheless, a user needs to select any option in the above described system.

The present invention has been conceived in view of the above, and aims to provide a search system, an information processing device, a method for controlling an information processing device, a program, and an information storage medium capable of assisting a user so as to readily select an option in the search system for presenting to the user a plurality of options and searching for information based on selection by the user.

Solution to Problem

In order to achieve the above described object, a search system according to the present invention includes search condition data storage means for storing search condition data having a tree structure in which a search condition and a node are correlated with each other; current node information storage means for storing current node information indicating a current node being a node currently selected by a user among nodes in the tree structure; selection screen display control means for displaying a selection screen showing a plurality of lower node information items corresponding to a plurality of lower nodes positioned immediately below the current node on a display means to thereby encourage the user to select any of the plurality of lower nodes; current node changing means for changing, in the case where the user selects any of the plurality of lower nodes, the current node to the lower node selected by the user; and search result screen display control means for displaying, in the case where the user performs a display instructing operation or a lowest node is set as the current node, a search result screen showing a list of information items satisfying a search condition corresponding to nodes from a top node to the current node on the display means, wherein the selection screen display control means outputs, so as to be correlated to each of the plurality of lower node information items in the selection screen, a display concerning a list of information items satisfying a search condition corresponding to nodes from the top node to a lower node corresponding to the lower node information item.

Further, an information processing device according to the present invention includes means for obtaining current node information stored in current node information storage means storing the current node information, the current node information indicating a current node being a node currently selected by a user among nodes in a tree structure of search condition data having the tree structure in which a search condition and a node are correlated with each other; selection screen display control means for displaying a selection screen showing a plurality of lower node information items corresponding to a plurality of lower nodes positioned immediately below the current node on display means to thereby encourage the user to select any of the plurality of lower nodes; and search result screen display control means for displaying, in the case where the user performs a display instructing operation or a lowest node is set as the current node, a search result screen showing a list of information items satisfying a search condition corresponding to nodes from a top node to the current node on the display means, wherein the selection screen display control means outputs, so as to be correlated to each of the plurality of lower node information items in the selection screen, a display concerning a list of information items satisfying a search conditions corresponding to nodes from the top node to a lower node corresponding to the lower node information item.

Further, a method for controlling an information processing device according to the present invention includes a step of obtaining current node information stored in current node information storage means storing the current node information, the current node information indicating a current node being a node currently selected by a user among nodes in a tree structure of search condition data having the tree structure in which a search condition and a node are correlated with each other; a selection screen display control step of displaying a selection screen showing a plurality of lower node information items corresponding to a plurality of lower nodes positioned immediately below the current node on display means to thereby encourage the user to select any of the plurality of lower nodes; and a search result screen display control step of displaying, in the case where the user performs a display instructing operation or a lowest node is set as the current node, a search result screen showing a list of information items satisfying a search condition corresponding to nodes from a top node to the current node on the display means, wherein the selection screen display control step includes a step of outputting, so as to be correlated to each of the plurality of lower node information items in the selection screen, a display concerning a list of information items satisfying a search condition corresponding to nodes from the top node to a lower node corresponding to the lower node information item.

Further, a program according to the present invention is a program for causing a computer to function as means for obtaining current node information stored in current node information storage means storing the current node information, the current node information indicating a current node being a node currently selected by a user among nodes in a tree structure of search condition data having the tree structure in which a search condition and a node are correlated with each other; selection screen display control means for displaying a selection screen showing a plurality of lower node information items corresponding to a plurality of lower nodes positioned immediately below the current node on display means to thereby encourage the user to select any of the plurality of lower nodes; and search result screen display control means for displaying, in the case where the user performs a display instructing operation or a lowest node is set as the current node, a search result screen showing a list of information items satisfying a search condition corresponding to nodes from a top node to the current node on the display means, wherein the selection screen display control means outputs, so as to be correlated to each of the plurality of lower node information items in the selection screen, a display concerning a list of information items satisfying a search condition corresponding to nodes from the top node to a lower node corresponding to the lower node information item.

Further, an information recording medium according to the present invention is a computer readable information recording medium recording a program for causing a computer to function as means for obtaining current node information stored in current node information storage means storing the current node information, the current node information indicating a current node being a node currently selected by a user among nodes in a tree structure of search condition data having the tree structure in which a search condition and a node are correlated with each other; selection screen display control means for displaying a selection screen showing a plurality of lower node information items corresponding to a plurality of lower nodes positioned immediately below the current node on display means to thereby encourage the user to select any of the plurality of lower nodes; and search result screen display control means for displaying, in the case where the user performs a display instructing operation or a lowest node is set as the current node, a search result screen showing a list of information items satisfying a search condition corresponding to nodes from a top node to the current node on the display means, wherein the selection screen display control means outputs, so as to be correlated to each of the plurality of lower node information items in the selection screen, a display concerning a list of information items satisfying a search condition corresponding to nodes from the top node to a lower node corresponding to the lower node information item.

According to one aspect of the present invention, the selection screen display control means may output, so as to be correlated to each of the plurality of lower node information items, a display concerning a list of information items satisfying the search condition corresponding to the nodes from the top node to the lower node corresponding to the lower node information item but not a search condition corresponding to another node or other nodes among the plurality of lower nodes.

According to one aspect of the present invention, the search system may further include obtaining means for obtaining, with respect to each of the plurality of lower nodes, a list of information items satisfying the search condition corresponding to the nodes from the top node to the lower node; and priority setting means for setting a display priority for each of the information items in the list of information items obtained by the obtaining means, wherein the selection screen display control means may display, so as to be correlated to each of the plurality of lower node information items, the list of information items satisfying the search condition corresponding to the nodes from the top node to the lower node corresponding to the lower node information item, based on the display priority set for each of the information items, and in the case of setting the display priority for each of the information items in the list of information items satisfying the search condition corresponding to the nodes from the top node to the lower node, the priority setting means may set a display priority of an information item satisfying a search condition corresponding to another node or other nodes among the plurality of lower nodes lower than a display priority of an information item not satisfying the search condition corresponding to the another node or the other nodes among the plurality of lower nodes.

According to one aspect of the present invention, the selection screen display control means may display the plurality of lower node information items and an upper node information item corresponding to an upper node positioned immediately above the current node in the selection screen to thereby encourage the user to select any of nodes including the plurality of lower nodes and the upper node, the current node changing means may change the current node to the upper node in the case where the user selects the upper node, and the selection screen display control means may output, so as to be correlated to the upper node information item, a display concerning a list of information items satisfying a search condition corresponding to nodes from the top node to the upper node but not a search condition correlated to the current node.

According to one aspect of the present invention, the selection screen display control means may display the plurality of lower node information items and an upper node information item corresponding to an upper node positioned immediately above the current node in the selection screen to thereby encourage the user to select any of nodes including the plurality of lower nodes and the upper node, the current node changing means may change the current node to the upper node in the case where the user selects the upper node, the search system may include means for obtaining a list of information items satisfying a search condition corresponding to the nodes from the top node to the upper node, and priority setting means for setting a display priority for each of the information items in the list of information items satisfying the search condition corresponding to the nodes from the top node to the upper node, the selection screen display control means may display, so as to be correlated to the upper node information item, the list of information items satisfying the search condition corresponding to the nodes from the top node to the upper node, based on the display priority set for each of the information items, and the priority setting means may set a display priority of an information item satisfying a search condition corresponding to the current node in the list of information items satisfying the search conditions correlated to the respective nodes from the top node to the upper node lower than a display priority of an information item not satisfying the search condition corresponding to the current node.

According to one aspect of the present invention, the tree structure may include a first node and a plurality of nodes positioned immediately below the first node, the plurality of nodes positioned immediately below the first node may include a second node and a third node, in the case where the first node is set as the current node, the selection screen may include a lower node information item corresponding to the second node and a lower node information item corresponding to the third node, in the case where the user selects the second node among the plurality of nodes positioned immediately below the first node while the first node is set as the current node, the current node changing means may change the current node from the first node to the second node, in the case where the user performs a return instructing operation for returning the current node to the first node after the current node is changed from the first node to the second node, the current node changing means may return the current node from the second node to the first node, and in the case where the current node is returned from the second node to the first node, the selection screen display control means may output, so as to be correlated to the lower node information corresponding to the third node in the selection screen, a display concerning a list of information items satisfying a search condition corresponding to nodes from the top node to the third node but not a search condition corresponding to the second node.

According to one aspect of the present invention, the search system may further include means for determining whether or not the return instructing operation is performed after elapse of a reference period of time after the current node is changed from the first node to the second node, wherein in a case where the current node is returned from the second node to the first node, the selection screen display control means may output, so as to be correlated to the lower node information item corresponding to the third item in the selection screen, a display concerning a list of information items satisfying the search condition corresponding to the nodes from the top node to the third node, if the return instructing operation is performed before elapse of the reference period of time, and may output, so as to be correlated to the lower node information item corresponding to the third item in the selection screen, the display concerning the list of information items satisfying the search condition corresponding to the nodes from the top node to the third node but not the search condition corresponding to the second node, if the return instructing operation is performed after elapse of the reference period of time.

According to one aspect of the present invention, in the case where the user performs the display instructing operation while the second node is set as the current node, the search result screen display control means may display the search result screen showing a list of information items satisfying a search condition corresponding to nodes from the top node to the second node on the display means, as a search result screen corresponding to the second node, the search system may include means for determining whether or not the return instructing operation is performed after the search result screen corresponding to the second node is displayed, and in the case where the current node is returned from the second node to the first node, the selection screen display control means may output, so as to be correlated to the lower node information item corresponding to the third item in the selection screen, a display concerning a list of information items satisfying the search condition corresponding to the nodes from the top node to the third node, if the return instructing operation is performed before the search result screen corresponding to the second node is displayed, and may output, so as to be correlated to the lower node information item corresponding to the third item in the selection screen, the display concerning the list of information items satisfying the search condition corresponding to the nodes from the top node to the third node but not the search condition corresponding to the second node, if the return instructing operation is performed after the search result screen corresponding to the second node is displayed.

According to one aspect of the present invention, the tree structure may include a first node and a plurality of nodes positioned immediately below the first node, the plurality of nodes positioned immediately below the first node may include a second node and a third node, in the case where the first node set as the current node, the selection screen may include a lower node information item corresponding to the second node and a lower node information item corresponding to the third node, in the case where the user selects the second node among the plurality of nodes positioned immediately below the first node while the first node is set as the current node, the current node changing means may change the current node from the first node to the second node, in the case where the user performs a return instructing operation for returning the current node to the first node after the current node is changed from the first node to the second node, the current node changing means may return the current node from the second node to the first node, and the search system may include means for obtaining a list of information items satisfying a search condition corresponding to the nodes from the top node to the third node, and priority setting means for setting a display priority for each of the information items in the list of information items satisfying the search condition corresponding to the nodes from the top node to the third node, in the case where the current node is returned from the second node to the first node, the selection screen display control means may display, so as to be correlated to the lower node information item corresponding to the third node in the selection screen, the list of information items satisfying the search condition corresponding to the nodes from the top node to the third node, based on the display priority set for each of the information items, and in the case where the current node is returned from the second node to the first node, the priority setting means may set a display priority of an information item satisfying a search condition corresponding to the second node in the list of information items satisfying the search condition corresponding to the nodes from the top node to the third node lower than a display priority of an information item not satisfying the search condition corresponding to the second node.

According to one aspect of the present invention, the search system may further include means for determining whether or not the return instructing operation is performed after elapse of a reference period of time after the current node is changed from the first node to the second node, wherein in the case where the current node is returned from the second node to the first node and it is determined that the return instructing operation is performed after elapse of the reference period of time, the priority setting means may set the display priority of the information item satisfying the search condition corresponding to the second node in the list of information items satisfying the search condition corresponding to the nodes from the top node to the third node lower than the display priority of the information item not satisfying the search condition corresponding to the second node.

According to one aspect of the present invention, in the case where the user performs the display instructing operation while the second node is set as the current node, the search result screen display control means may display the search result screen showing a list of information items satisfying a search condition corresponding to nodes from the top node to the second node on the display means, as a search result screen corresponding to the second node, the search system may include means for determining whether or not the return instructing operation is performed after the search result screen corresponding to the second node is displayed, and in the case where the current node is returned from the second node to the first node and it is determined that the return instructing operation is performed after the search result screen corresponding to the second node is displayed, the priority setting means may set the display priority of the information item satisfying the search condition corresponding to the second node in the list of information items satisfying the search condition corresponding to the nodes from the top node to the third node lower than the display priority of the information item not satisfying the search condition corresponding to the second node.

According to one aspect of the present invention, the tree structure may include a first node and a plurality of nodes positioned immediately below the first node, the plurality of nodes positioned immediately below the first node may include a second node and a third node, in the case where the user selects the second node among the plurality of nodes positioned immediately below the first node while the first node is set as the current node, the current node changing means may change the current node from the first node to the second node, in the case where the user performs a return instructing operation for returning the current node to the first node after the current node is changed from the first node to the second node, the current node changing means may return the current node from the second node to the first node, and in the case where the user selects the third node among the plurality of nodes positioned immediately below the first node after the current node is returned from the second node to the first node, the current node changing means may change the current node from the first node to the third node, and in the case of displaying the search result screen on the display means after the current node is changed from the first node to the third node after the current node is returned from the second node to the first node, the search result screen display control means may display a search result screen showing a list of information items satisfying a search condition corresponding to the nodes from the top node to the third node but not a search condition corresponding to the second node, as the search result screen.

According to one aspect of the present invention, the search system may further include means for determining whether or not the return instructing operation is performed after elapse of a reference period of time after the current node is changed from the first node to the second node, wherein in the case of displaying the search result screen on the display means after the current node is changed from the first node to the third node after the current node is returned from the second node to the first node, the search result screen display control means [1] may display a search result screen showing a list of information items satisfying the search condition corresponding to the nodes from the top node to the third node, if the return instructing operation is performed before elapse of the reference period of time, and [2] may display a search result screen showing the list of information items satisfying the search condition corresponding to the nodes from the top node to the third node but not the search condition corresponding to the second node, if the return instructing operation is performed after elapse of the reference period of time.

According to one aspect of the present invention, in the case where the user performs the display instructing operation while the second node is set as the current node, the display result screen display control means may display the search result screen showing an information item satisfying a search condition corresponding to the nodes from the top node to the second node on the display means, as a search result screen corresponding to the second node, the search system may include means for determining whether or not the return instructing operation is performed after the search result screen corresponding to the second node is displayed, and in the case of displaying the search result screen on the display means after the current node is changed from the first node to the third node after the current node is returned from the second node to the first node, the display result screen display control means [1] may display a search result screen showing a list of information items satisfying the search condition corresponding to the nodes from the top node to the third node, if the return instructing operation is performed before the search result screen corresponding to the second node is displayed, and [2] may display a search result screen showing the list of information items satisfying the search condition corresponding to the nodes from the top node to the third node but not the search condition corresponding to the second node, if the return instructing operation is performed after the search result screen corresponding to the second node is displayed.

According to one aspect of the present invention, the tree structure may include a first node and a plurality of nodes positioned immediately below the first node, the plurality of nodes positioned immediately below the first node may include a second node and a third node, in the case where the user selects the second node among the plurality of nodes positioned immediately below the first node while the first node is set as the current node, the current node changing means may change the current node from the first node to the second node, in the case where the user performs a return instructing operation for returning the current node to the first node after the current node is changed from the first node to the second node, the current node changing means may return the current node from the second node to the first node, and in the case where the user selects the third node among the plurality of nodes positioned immediately below the first node after the current node is returned from the second node to the first node, the current node changing means may change the current node from the first node to the third node, and the search system may include means for obtaining a list of information items satisfying a search condition corresponding to nodes from the top node to the third node, and priority setting means for setting a display priority of each of the information items in the list of information items satisfying the search condition corresponding to the nodes from the top node to the third node, in the case of displaying the search result screen on the display means after the current node is changed from the first node to the third node after the current node is returned from the second node to the first node, the search result screen display control means may display a search result screen showing the list of the information items satisfying the search condition corresponding to the nodes from the top node to the third node, based on the display priority set to each information item, and in a case where the current node is changed from the first node to the third node after the current node is returned from the second node to the first node, the priority setting means may set a display priority of an information item satisfying a search condition corresponding to the second node in the list of information items satisfying the search condition corresponding to the nodes from the top node to the third node lower than a display priority of an information item not satisfying the search condition corresponding to the second node.

According to one aspect of the present invention, the search system may further include means for determining whether or not the return instructing operation is performed after elapse of a reference period of time after the current node is changed from the first node to the second node, wherein in the case where it is determined that the return instructing operation is performed after elapse of the reference period of time and the current node is changed from the first node to the third node after the current node is returned from the second node to the first node, the priority setting means may set the display priority of the information item satisfying the search condition corresponding to the second node in the list of information items satisfying the search condition corresponding to the nodes from the top node to the third node lower than the display priority of the information item not satisfying the search condition corresponding to the second node.

According to one aspect of the present invention, in the case where the user performs the display instructing operation while the second node is set as the current node, the search result screen display control means may display the search result screen showing a list of information items satisfying a search condition corresponding to the nodes from the top node to the second node on the display means, as a search result screen corresponding to the second node, the search system may further include means for determining whether or not the return instructing operation is performed after the search result screen corresponding to the second node is displayed, and in the case where it is determined that the return instructing operation is performed after the search result screen corresponding to the second node is displayed and the current node is changed from the first node to the third node after the current node is returned from the second node to the first node, the priority setting means may set the display priority of the information item satisfying the search condition corresponding to the second node in the list of information items satisfying the search condition corresponding to the nodes from the top node to the third node lower than the display priority of the information item not satisfying the search condition corresponding to the second node.

Effect of the Invention

According to the present invention, in a system for presenting to a user, for example, a plurality of options and searching for information, based on a selection by the user, it is possible to assist the user so as to readily select an option.

BRIEF DESCRIPTION OF DRAWINGS

FIG. 6 explains search condition data;
FIG. 11 shows one example of a current node information;
FIG. 12 is a flowchart showing one example of processing that is executed in an information processing device.

DESCRIPTION OF EMBODIMENTS

In the following, an example of an embodiment of the present invention will be described in detail, bases on the drawings.

Figure 1:
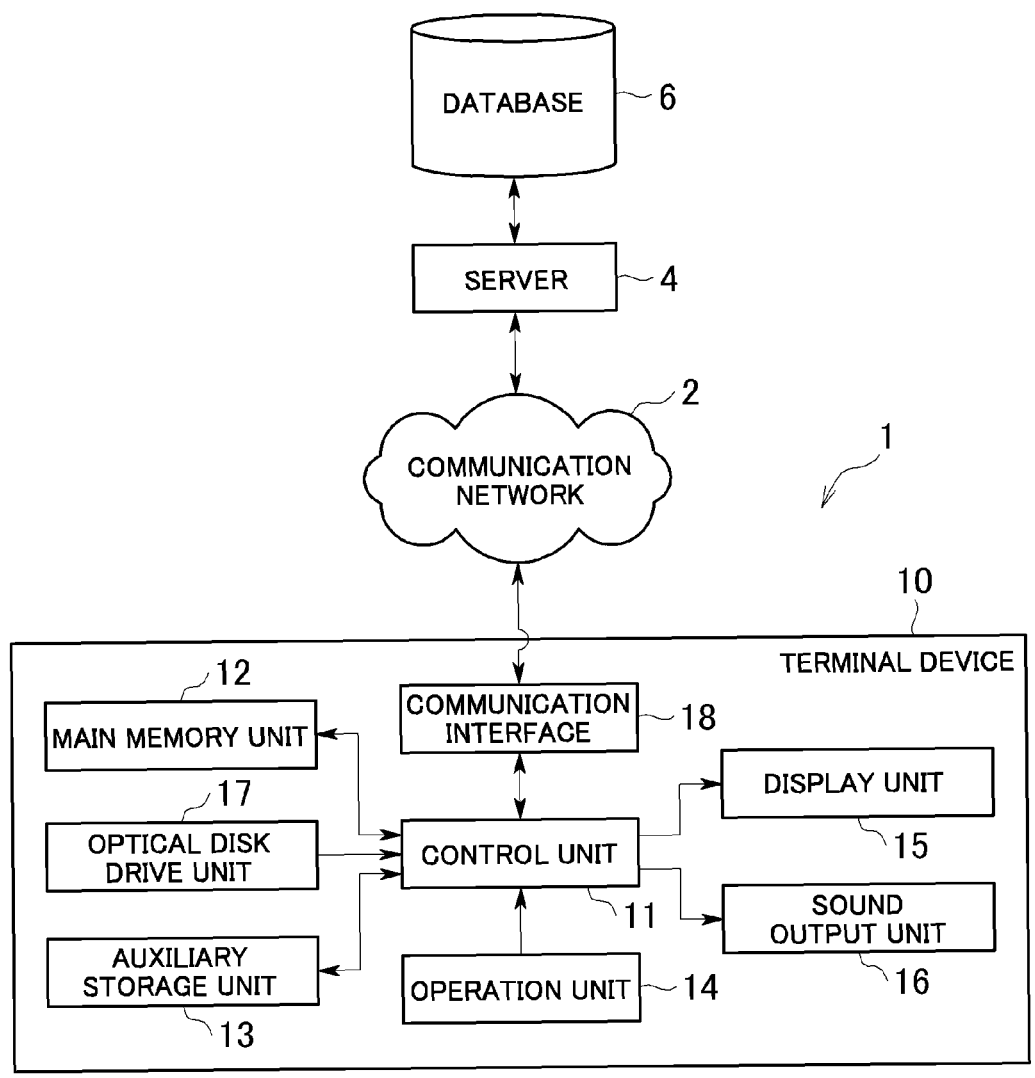
FIG. 1 shows one example of an overall structure of a search system according to an embodiment of the present invention.

FIG. 1 shows one example of an overall structure of a search system according to the embodiment of the present invention. As shown in FIG. 1, a search system 1 includes a server 4, a database 6, and a terminal device 10 (an information processing device). The server 4 and the terminal device 10 are connected to a communication network 2 including, for example, the Internet or the like, so as to mutually exchange data.

The terminal device 10 includes a control unit 11, a main memory unit 12, an auxiliary storage unit 13, an operation unit 14, a display unit 15, a sound output unit 16, an optical disk drive unit 17, and a communication interface 18.

The control unit 11 includes, for example, one or more CPUs, and executes information processing according to an operation system or a program stored in the auxiliary storage unit 13. The main memory unit 12 is, for example, a RAM; the auxiliary storage unit 13 is, for example, a hard disk or a solid state drive.

The operation unit 14 is provided for an operation by a user. In this embodiment, a designation unit for a user to designate a position in a screen displayed on the display unit 15 is provided as the operation unit. That is, for example, a pointing device, such as a touch panel, a mouse, a stick, or the like, is provided as the operation unit. The following description is based on an assumption that a touch panel formed over the display unit 15 is included in the terminal device 10.

The touch panel included in the terminal device 10 is a typical touch panel, and capable of detecting one or more positions touched by a user. For example, a touch panel employing an electrostatic capacitance method is used. According to the touch panel employing the electrostatic capacitance method, one or more positions touched by the user is/are detected based on change in the charge that is caused by the user touching the surface of the touch panel. The touch panel provides information indicating one or more positions touched by the user. The control unit 11 obtains the one or more positions touched by the user, based on the information provided by the touch panel.

The display unit 15 is, for example, a liquid crystal display or the like, and the sound output unit 16 is, for example, a speaker or the like. The optical disk drive unit 17 reads a program and data stored on an optical disk (an information storage medium).

Note that, for example, a program and data are supplied to the auxiliary storage unit 13 via the optical disk. That is, the optical disk storing a program and data is mounted on the optical disk drive unit 17, and the program and data stored on the optical disk are read by the optical disk drive unit 17 and stored in the auxiliary storage unit 13. Note that the optical disk drive unit 17 is not an essential structural component. A structural component for reading a program or data stored in an information storage medium other than the optical disk (for example, a memory card) may be included instead of the optical disk drive unit 17, so that a program and data may be supplied to the auxiliary storage unit 13 via the information storage medium other than the optical disk. Alternatively, a program and data may be supplied to the auxiliary storage unit 13 via a communication network 2 including, for example, the Internet or the like.

The communication interface 18 is an interface for connecting the terminal device 10 to the communication network 2. The terminal device 10 can access the server 4 via the communication network 2.

The server 4 executes processing based on a processing request received from the terminal device 10. For example, a daemon program is executed in the server 4. In a case where the server 4 receives a processing request from the terminal device 10, the server 4 accesses the database 6, when necessary, and returns a processing result corresponding to the processing request to the terminal device 10. Note that the database 6 may be created in a server computer different from the server 4 or in the server 4.

The following description is based on an assumption that an electronic commerce site for shopping a product via the communication network 2 is provided by the server 4. The following description is further based on an assumption that an application program for presenting to a user a recommended product among products that is currently sold in the above-described electronic commerce site is executed in the terminal device 10.

Figure 2:
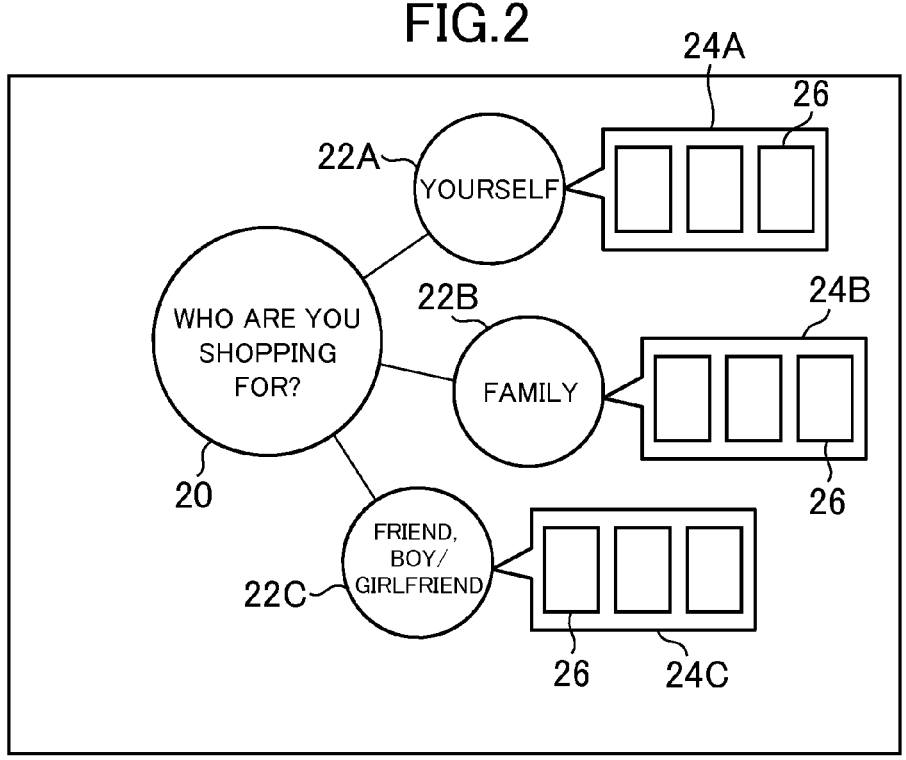
FIG. 2 shows one example of a question screen.
Figure 3:
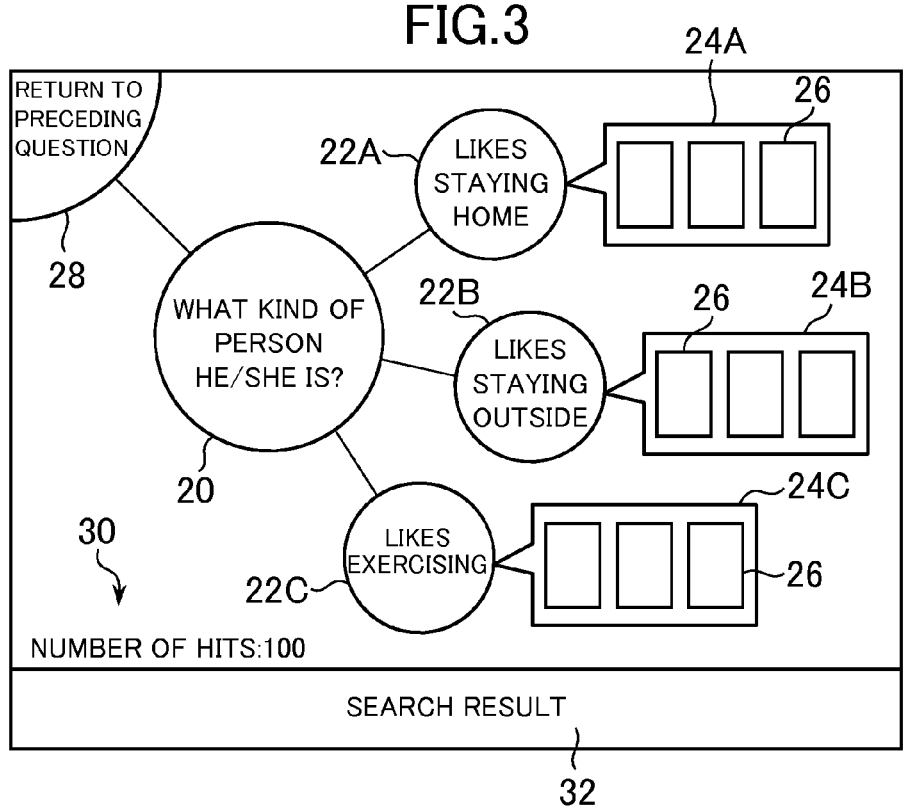
FIG. 3 shows another example of a question screen.
Figure 4:
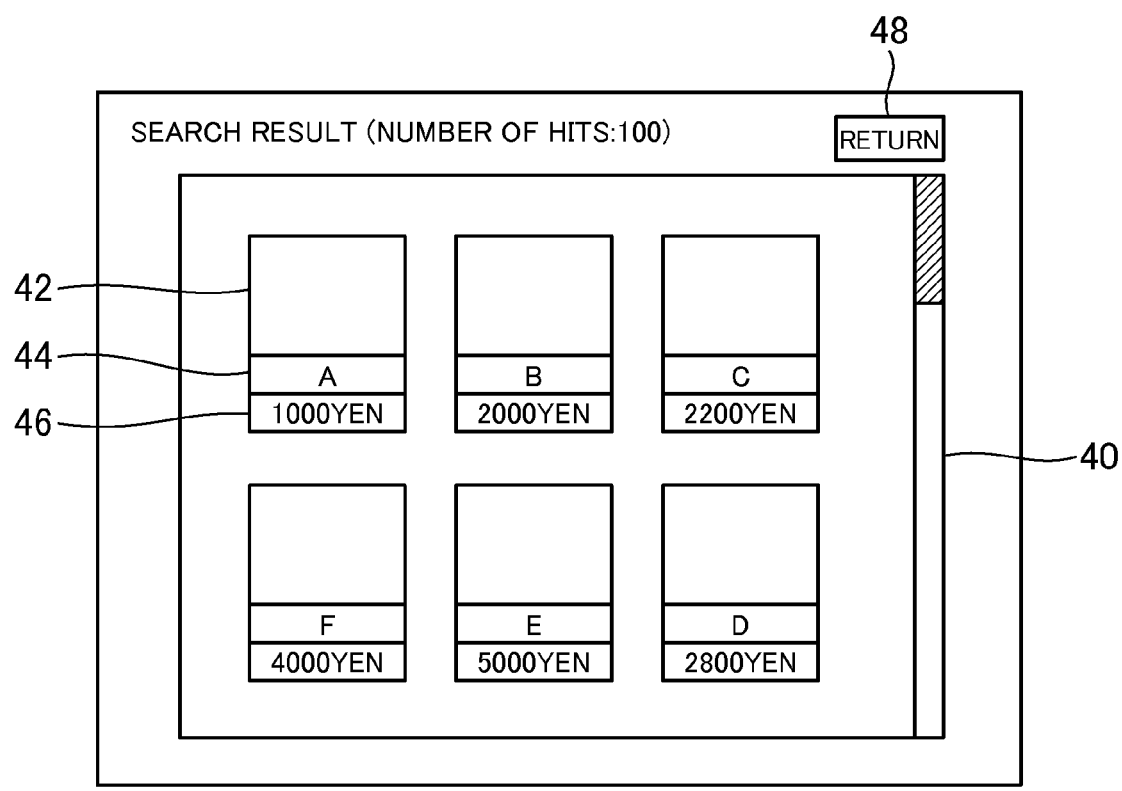
FIG. 4 shows one example of a search result screen.

Initially, the above-described application program will be described. The above-described application program presents to a user a question and a plurality of options that are selectable as an answer to the question, and presents to the user a recommended product based on an answer of the user. FIGS. 2 to 4 show one example of a screen that is displayed on the display unit 15 of the terminal device 10 when the above-described application program is executed.

FIG. 2 shows one example of a question screen initially displayed. As shown in FIG. 2, the question screen includes a question area 20 and a plurality of option areas 22A, 22B, 22C. The question screen further includes pre-presentation areas 24A, 24B, 24C to be described later.

A question to a user is shown in the question area 20. In the example shown in FIG. 2, a question "who are you shopping for?" is shown in the question area 20. Options that are selectable as an answer to the question are respectively shown in the respective option areas 22A, 22B, 22C. In the example shown in FIG. 2, an option "yourself" is shown in the option area 22A; an option "family" is shown in the option area 22B; an option "friend, boy/girlfriend" is shown in the option area 22C. Although three options are shown in the example shown in FIG. 2, two or four or more options may be shown.

In the question screen shown in FIG. 2, the user selects any option. For example, in order to select the option "friend, boy/girlfriend", the user touches an area on the touch panel corresponding to the option area 22C with his/her finger. In the description below, to touch an area on the touch panel corresponding to the option area 22C with his/her finger, for example, is described as "to point to (designate) the option area 22C".

When any option is selected, a next question screen is displayed. FIG. 3 shows one example of the question screen in this case. Note that FIG. 3 shows one example of the question screen that is displayed in a case where the option "friend, boy/girlfriend" is selected in the question screen shown in FIG. 2. A question which is associated with the option selected in the preceding question screen is shown in the question area 20 of the question screen in this case. Further, options that are selectable as an answer to the question are shown in the respective areas 22A, 22B, 22C. When any option is selected in the question screen, a further next question screen is displayed. That is, question screens are repetitively displayed in this manner until completion of answering a predetermined number of questions.

The question screen shown in FIG. 3 includes a return area 28. When the user points to the return area 28, a question screen that precedes the current question screen by one (a one-preceding question screen) is displayed, so that the user can answer over again.

The question screen shown in FIG. 3 further includes a hit number area 30 and a search result area 32. The application program obtains a list of recommended products based on the answers made thus far, even before the user answers all questions. The number of recommended products that are found in a search based on the answers made thus far is shown in the hit number area 30. When the user points to the search result area 32, a search result screen is displayed. According to the search result screen, the user can refer to a list of recommended products at that time (that is, a list of recommended products that are found in a search based on the answers made thus far).

FIG. 4 shows one example of the search result screen. As shown in FIG. 4, the search result screen includes a list area 40. A list of recommended products at that time is shown in the list area 40. Specifically, a product image 42 is shown in the list area 40, though not shown in FIG. 4. A product name 44 and a price 46 are additionally shown in the list area 40. The search result screen includes a return area 48 (a return button). When the user points to the return area 48, the search result screen is closed to return to the question screen.

Below, data stored in the auxiliary storage unit 13 for displaying the above described question screen or search result screen will be described. In this embodiment, for example, question data and search condition data, such as is described below, is stored in the auxiliary storage unit 13.

Figure 5:
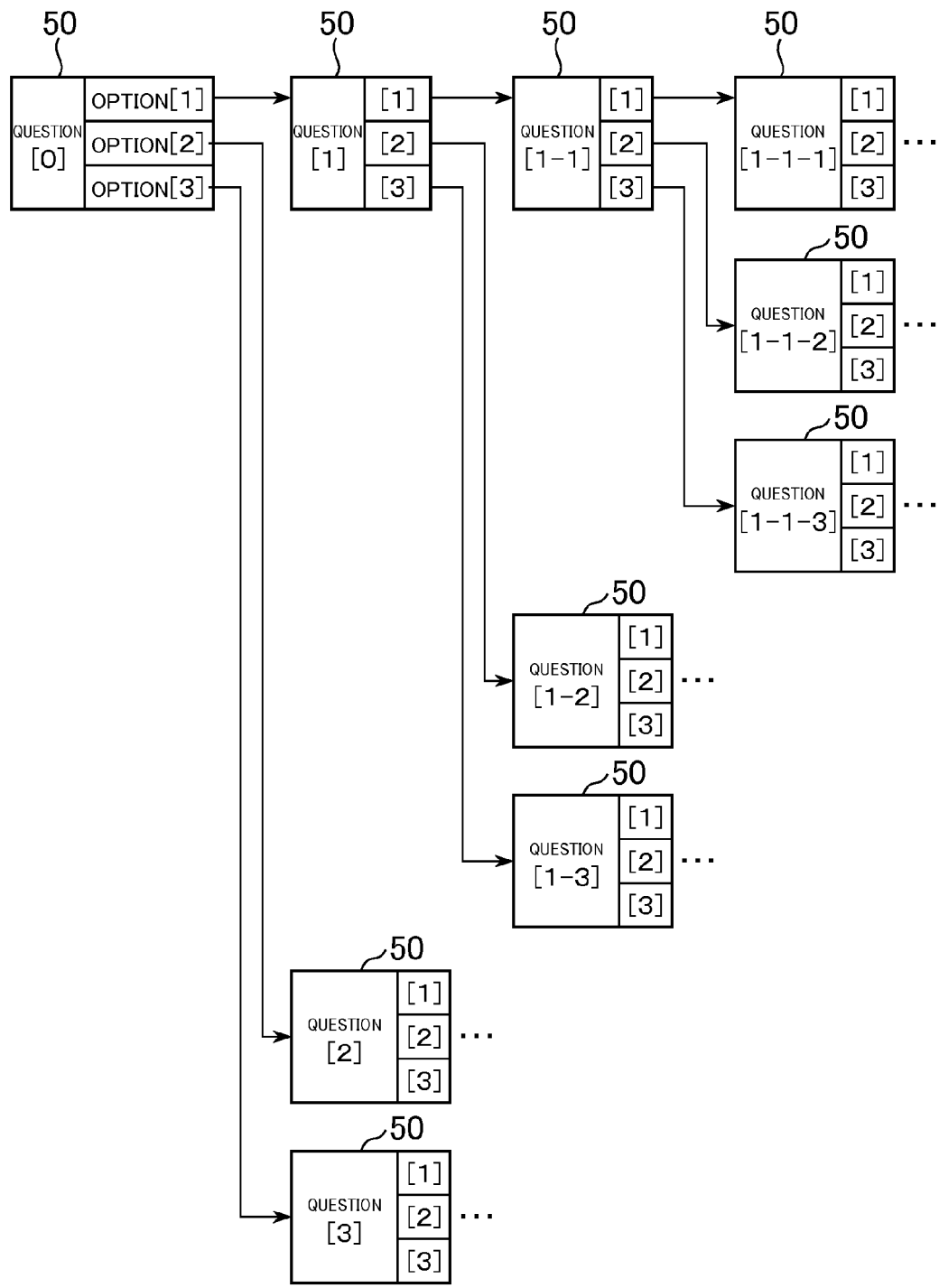
FIG. 5 explains question data.

FIG. 5 shows one example of the question data. As shown in FIG. 5, the question data has a tree structure. A combination of a question and a plurality of options is correlated to each node 50 in the tree structure.

A plurality of lower nodes 50 are positioned immediately below a node 50. That is, One lower node 50 is correlated to each of a plurality of options correlated to the node 50. For example, the node 50 of a question [1-1] is correlated to an option [1] for the node 50 of the question [1]. This means that a question screen including the question [1-1] is displayed when the option [1] is selected as an answer to the question [1]. Similarly, the node 50 of a question [1-2] is correlated to an option [2] for the node 50 of the question [1]; the node 50 of a question [1-3] is correlated to an option [3] for the node 50 of the question [1].

In FIG. 5, for example, the combination of the question [0] and the options [1], [2], [3] thereof corresponds to the question and options shown in the question screen shown in FIG. 2. That is, the question [0] corresponds to the question "who are you shopping for?"; the option [1] corresponds to the option "yourself"; the option [2] to the option "family"; the option [3] to the option "friend, boy/girlfriend".

As the question screen shown in FIG. 3 is displayed when the option "friend, boy/girlfriend" is selected in the question screen shown in FIG. 2, the combination of the question [3] and the options [1], [2], [3] in FIG. 5 corresponds to the question and the options shown in the question screen shown in FIG. 3. That is, the question [3] corresponds to the question "what kind of person is he/she?"; the option [1] corresponds to an option "likes staying home"; the option [2] to an option "likes staying outside"; the option [3] to an option "likes exercising".

Note that, for example, a node 50 to which the question [1-1] is correlated will be hereinafter referred to as a "node [1-1]". Further, for example, a question screen showing the question [1-1] is hereinafter referred to as a question screen [1-1].

FIG. 6 shows one example of search condition data. As shown in FIG. 6, the search condition data is data for correlating a search condition to each node 50 in the tree structure shown in FIG. 5. The search condition correlated to each node 50 is a search condition in which "an option of the immediately above (a parent) node 50" correlated to the node 50 is taken into consideration.

Focus on the node [3] here. The node [3] is positioned immediately below the node [0], being correlated to the option [3] of the node [0]. Thus, a search condition in which the content of the option [3] of the node [0] is taken into consideration is correlated to the node [3]. As described above, the node [0] corresponds to the question screen shown in FIG. 2, and the option [3] of the node [0] corresponds to the option "friend, boy/girlfriend". Thus, for example, a search condition for searching for a product to be recommended as a product (a present) to buy for a friend, boy/girlfriend, is correlated to the node [3].

Below, a relationship between a search condition correlated to each node 50 and a product list shown in the list area 40 in the search result screen will be described.

Figure 7:
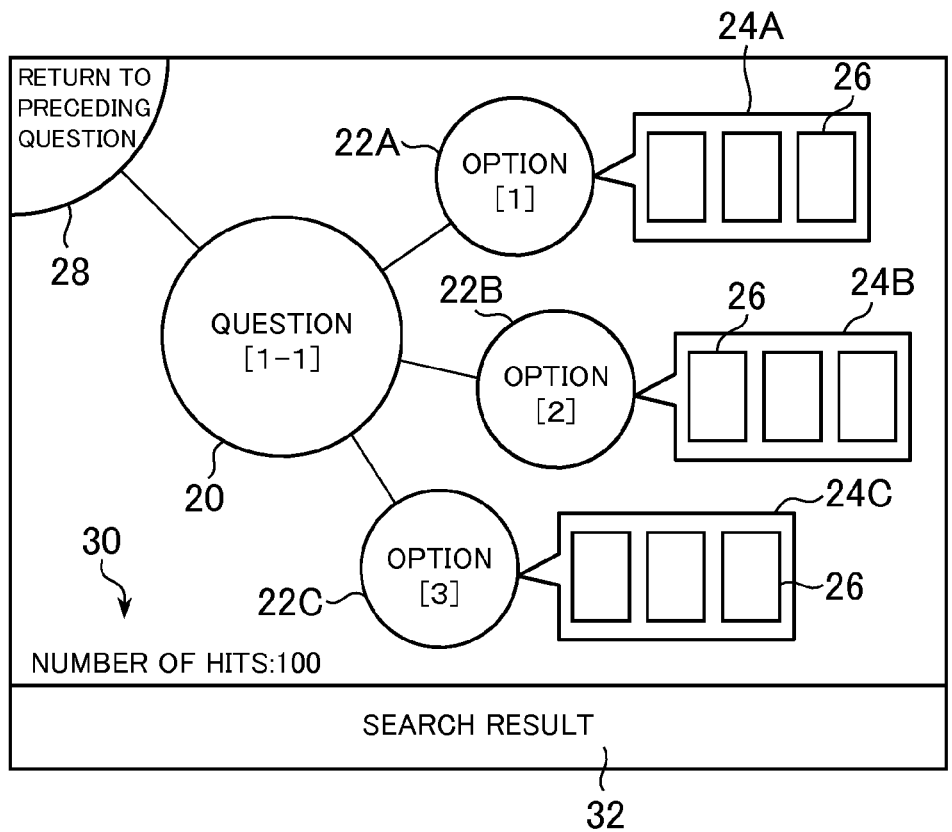
FIG. 7 shows one example of a question screen [1-1]

Assume here a case in which the question screen [1-1] is displayed. FIG. 7 shows the question screen [1-1]. For brevity of description, specific content of a question and an option is not shown in FIG. 7.

Figure 8:
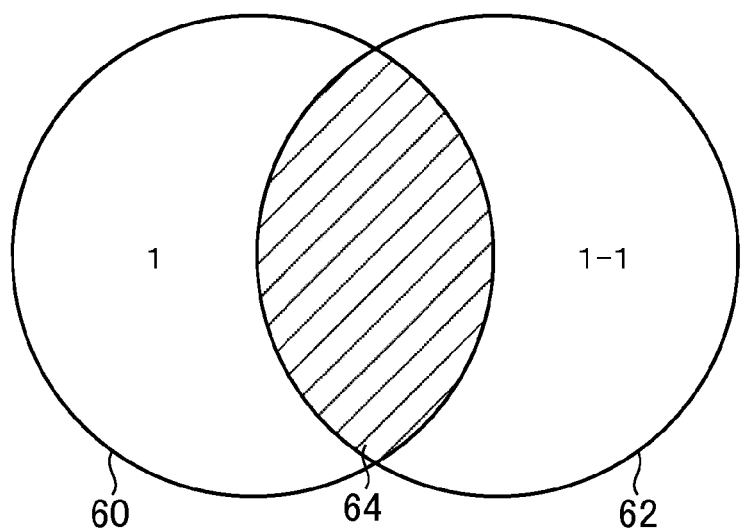
FIG. 8 explains one example of a search result that is shown in a case where a user points to a search area in the question screen [1-1]

When the user points to the search result area 32 in the question screen [1-1], a list of products satisfying the search condition corresponding to the nodes 50 from the top node [0] to the node [1-1] is shown in the list area 40 of the search result screen. FIG. 8 explains a product list shown in the list area 40 of the search result screen in this case. The reference numeral "60" in FIG. 8 indicates a set of products satisfying the search condition correlated to the node [1]; the reference numeral "62" indicates a set of products satisfying the search condition correlated to the node [1-1].

"The search condition corresponding to the nodes 50 from the node [0] to the node [1-1]" correspond to an AND condition of the search condition correlated to the node [0], the search condition correlated to the node [1], and the search condition correlated to the node [1-1]. In actuality, however, as no search condition is correlated to the node [0], an AND condition of the search condition correlated to the node [1] and the search condition correlated to the node [1-1] corresponds to "the search condition corresponding to the nodes 50 from the node [0] to the node [1-1]".

That is, a list of products satisfying the search condition correlated to the node [1] and the search condition correlated to the node [1-1] is shown in the list area 40 of the search result screen in this case. That is, as shown in FIG. 8, a list of products belonging to the intersection 64 (the diagonally lined part) of the set 60 of products satisfying the search condition correlated to the node [1] and the set 62 of products satisfying the search condition correlated to the node [1-1] is shown in the list area 40. Note that in this case, the number of products belonging to the above mentioned intersection 64 is shown in the hit number area 30 of the question screen [1-1] shown in FIG. 7.

Figure 9:
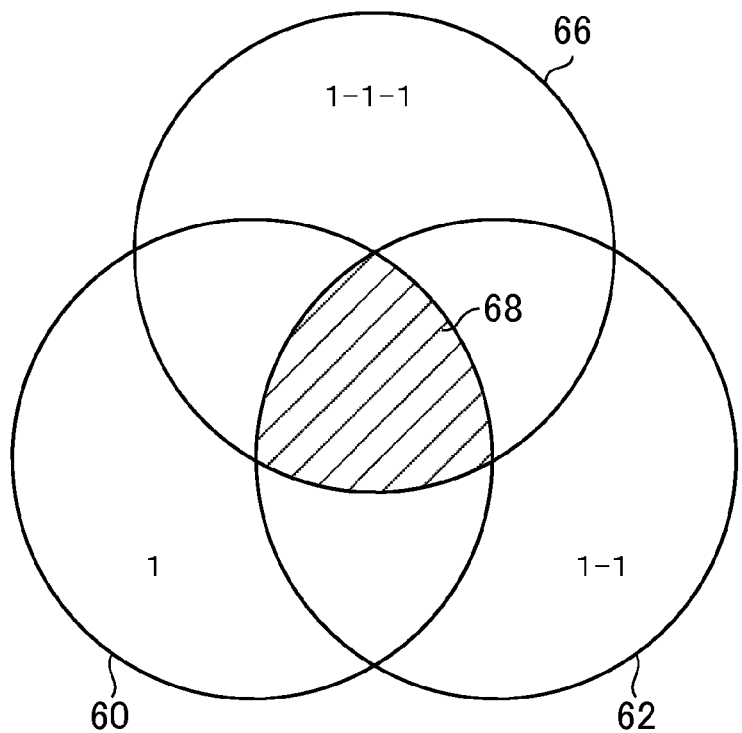
FIG. 9 explains one example of a search result that is shown in a case where a user points to a search area in a question screen [1-1-1]

Below, a product list that is shown in the list area 40 of the search result screen when the user points to the search result area 32 in the question screen [1-1-1] will be described. FIG. 9 explains a product list that is shown in the list area 40 in the search result screen in this case. Note that the reference numeral "66" in FIG. 9 indicates a set of products satisfying the search condition correlated to the node [1-1-1].

When the user points to the search result area 32 of the question screen [1-1-1], a list of products satisfying the search conditions corresponding to the nodes 50 from the top node [0] to the node [1-1-1] is shown in the list area 40 in the search result screen.

That is, in this case, as shown in FIG. 9, a list of products belonging to the intersection 68 (the diagonally lined part) of a set 60 of products satisfying the search condition correlated to the node [1], a set 62 of products satisfying the search condition correlated to the node [1-1], and a set 66 of products satisfying the search condition correlated to the node [1-1-1] is shown in the list area 40. That is, in this case, a list of products satisfying the search condition correlated to the node [1], the search condition correlated to the node [1-1], and the search condition correlated to the node [1-1-1] is shown in the list area 40.

Below, the pre-presentation areas 24A, 24B, 24C will be described. Specifically, the pre-presentation areas 24A, 24B, 24C will be described with reference to the question screen [1-1] shown in FIG. 7.

As shown in FIG. 7, the pre-presentation area 24A is displayed so as to be correlated to the option area 22A and has a balloon shape in the example shown in FIG. 7.

The pre-presentation area 24A serves to present to a user in advance what kinds of products will be listed as recommended products when the user selects the option shown in the option area 22A. That is, at least one of the products that are listed as recommended products when the user selects the option shown in the option area 22A is displayed in the pre-presentation area 24A.

"A product that is listed as a recommended product when the user selects the option shown in the option area 22A" refers to a product that is shown in the list area 40 of the search result screen when the user points to the search result area 32 of a following question screen that is displayed in a case where the user selects the option shown in the option area 22A. That is, in this case, "the product that is listed as a recommended product when the user selects the option shown in the option area 22A" refers to a product that is shown in the list area 40 of the search result screen when the user points to the search result area 32 of the question screen [1-1-1], that is, a product belonging to the intersection 68 shown in FIG. 9. In this embodiment, as shown in FIG. 7, thumbnail images 26 of three products among those described above are displayed in the pre-presentation area 24A.

Further, as shown in FIG. 7, the pre-presentation area 24B is displayed so as to be correlated to the option area 22B. The pre-presentation area 24B is similar to the pre-presentation area 24A. That is, the pre-presentation area 24B serves to present to the user in advance what kind of products will be listed as recommended products when the user selects the option shown in the option area 22B. That is, at least one of the products that are listed as recommended produces when the user selects the option shown in the option area 22B is displayed in the pre-presentation area 24B.

As shown in FIG. 7, the pre-presentation area 24C is displayed so as to be correlated to the option area 22C. The pre-presentation area 24C is similar to the pre-presentation area 24A. That is, the pre-presentation area 24C serves to present to the user in advance what kind of products will be listed as recommended products when the user selects the option shown in the option area 22C. That is, at least one of the products that are listed as recommended products when the user selects the option shown in the option area 22C is displayed in the pre-presentation area 24C.

With provision of the above described pre-presentation areas 24A, 24B, 24C, the user can know before selection of an option what kinds of products will be listed as recommended products when the user selects the option. For example, although the user may not be able to decide which option to select in a case of some question or option, according to this embodiment, the user can decide which option to select, referring to the pre-presentation areas 24A, 24B, 24C.

Note that the shape of the pre-presentation area 24A is not limited to a balloon shape, but may be any other shape. Further, four or more products or two or fewer products may be shown in the pre-presentation area 24A. Still further, the product shown in the pre-presentation area 24A may change as time passes. Product information (for example, a name, a price, or the like) may be shown instead of or together with the thumbnail image 26 in the pre-presentation area 24A. The number of products that are listed as recommended products when the user selects the option in the option area 22A may be shown in the pre-presentation area 24A. The pre-presentation area 24A may be usually kept not shown, and shown only when the user performs a predetermined operation regarding the option area 22A. For example, when the user slides his/her finger on or touches with his/her two fingers an area on the touch panel corresponding to the option area 22A, the pre-presentation area 24A may be shown. This is similarly applicable to the pre-presentation areas 24B, 24C.

Figure 10:
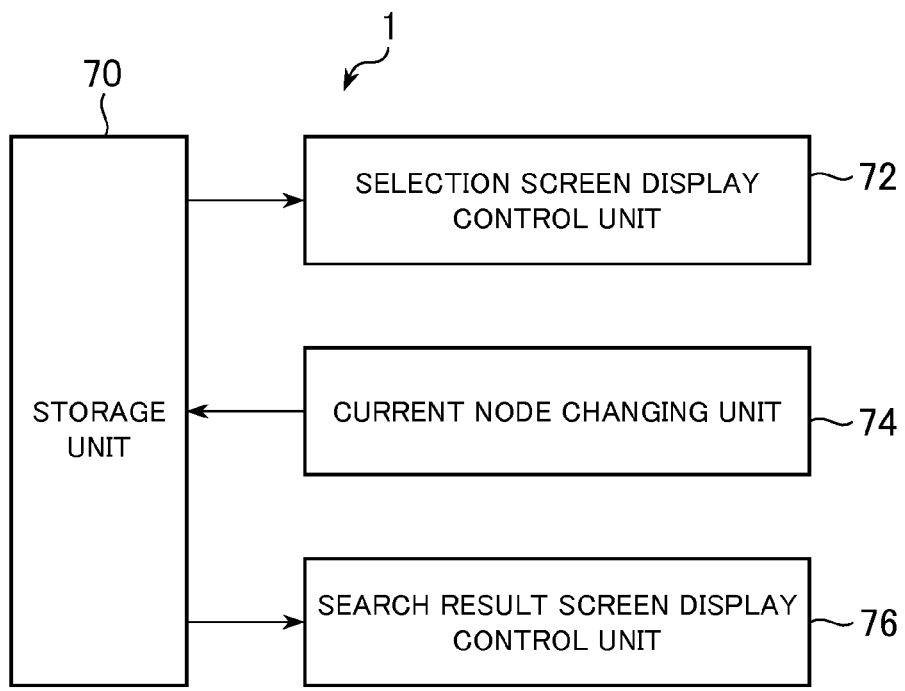
FIG. 10 is a functional block diagram of a search system according to the embodiment of the present invention.

Below, a structure for achieving the above described pre-presentation areas 24A, 24B, 24C will be described. FIG. 10 is a functional block diagram showing a function block relevant to the present invention among those achieved in the search system 1 according to this embodiment. As shown in FIG. 10, the search system 1 has a storage unit 70, a selection screen display control unit 72, a current node changing unit 74, and a search result screen display control unit 76.

For example, the storage unit 70 is the main memory unit 12 and the auxiliary storage unit 13 of the terminal device 10. For example, the selection screen display control unit 72, the current node changing unit 74, and the search result screen display control unit 76 are implemented by the control unit 11 of the terminal device 10. That is, the control unit 11 executes processing according to a program, to thereby function as the selection screen display control unit 72, the current node changing unit 74, and the search result screen display control unit 76.

Initially, the storage unit 70 will be described. Various data is stored in the storage unit 70. For example, the above-described question data (FIG. 5) is stored in the storage unit 70. Further, for example, the above-described search condition data (FIG. 6) is stored in the storage unit 70 (the search condition data storage means).

Further, current node information is stored in the storage unit 70 (the current node information storage means). FIG. 11 shows one example of the current node information. The current node information is information indicating a current node, that is, a node 50 currently selected by the user among the nodes 50 in the tree structure. For example, when the question screen [1-1] is displayed, it is understood that the user is positioned at the node [1-1], and therefore, the node [1-1] is the current node. In this case, as shown in FIG. 11, information indicating the node [1-1] is stored as the current node information.

Below, a selection screen display control unit 72 will be described.

Initially, the selection screen display control unit 72 displays on the display unit 15 a selection screen showing a plurality of lower node information items corresponding to a plurality of lower nodes positioned immediately below the current node. For example, the selection screen display control unit 72 displays in the selection screen a plurality of image information items (a plurality of lower node image information items) corresponding to a plurality of lower node information items. The selection screen display control unit 72 displays the selection screen to encourage the user to select any of the plurality of lower nodes.

In this embodiment, the selection screen display control unit 72 displays a question screen on the display unit 15. That is, in this embodiment, the question screen corresponds to the "selection screen", and the options shown in the respective option areas 22A, 22B, 22C correspond to the "lower node information items". In this embodiment, the option areas 22A, 22B, 22C correspond to the "lower node image information items".

In the selection screen, the selection screen display control unit 72 outputs, so as to be correlated to each of the plurality of lower node information items, a display concerning a list of information items satisfying the search condition corresponding to the nodes from the top node to a lower node that corresponds to the lower node information item.

Note that "to output a display concerning a list of information items" includes, for example, to display at least one information item among the information items included in the information list. Further, for example, to display the number of information items included in the information list is included in "to output a display concerning a list of information items".

Further, "to output a display concerning a list of information items so as to be correlated to a lower node information item" means to output the display concerning the list of information items in a manner such that the user can realize that the display concerning the list of information items is relevant to the lower node information item.

For example, "to output a display concerning a list of information items so as to be correlated to a lower node information item" means to output the display concerning the list of information items and further to display an image (for example, a balloon) for explicitly showing a correlation (association) between the lower node information item and the display concerning the list of information items.

Further, for example, "to output a display concerning a list of information items so as to be correlated to a lower node information item" means to output the display concerning the list of information items at a position near the display position of the lower node information item. That is, this means to output the display concerning the list of information items at a position that is set based on the display position of the lower node information item. In other words, this means to output the display concerning the list of information items at a position having a predetermined positional relationship with the display position of the lower node information item.

Also, for example, "to output a display concerning a list of information items so as to be correlated to a lower node information item" means to output the display concerning the list of information items when any operation is performed with respect to the lower node information item shown in the selection screen. For example, this means to output the display concerning the list of information items when the user slides his/her finger on or touches with his/her two fingers an area on the touch panel corresponding to the area where the lower node information item is shown.

In this embodiment, the selection screen display control unit 72 displays, for example, a thumbnail image 26 of a product belonging to the intersection 68 shown in FIG. 9 in the pre-presentation area 24A of the question screen [1-1].

Below, the current node changing unit 74 will be described. The current node changing unit 74 changes the current node. For example, when the user selects any of the plurality of lower nodes positioned immediately below the current node, the current node changing unit 74 changes the current node to the lower node selected by the user.

In this embodiment, when any of the options shown in the respective option areas 22A, 22B, 22C of the question screen is selected, the current node changing unit 74 changes the current node to the node 50 correlated to the option selected by the user among the nodes 50 positioned immediately below the current node. For example, when the option in the option area 22A of the question screen [1-1] is selected, the current node changing unit 74 changes the current node to the node [1-1-1].

Note that in this embodiment, when the user points to the return area 28 of the question screen, the current node changing unit 74 updates the current node to the node 50 positioned immediately above the current node (the parent node 50 of the current node). For example, when the user points to the return area 28 of the question screen [1-1], the current node changing unit 74 changes the current node to the node [1].

Below, the search result screen display control unit 76 will be described. When the user performs a display instructing operation or the lowest node is set as the current node, for example, the search result screen display control unit 76 displays on the display unit 15 a search result screen showing a list of information items satisfying the search condition corresponding to the nodes from the top node to the current node.

In this embodiment, for example, when the user points to the search result area 32 of the question screen [1-1], the search result screen display control unit 76 displays a search result screen showing a list of products belonging to the intersection 64 shown in FIG. 8 on the display unit 15. Further, for example, when the user points to the search result area 32 of the question screen [1-1-1], the search result screen display control unit 76 displays a search result screen showing a list of products belonging to the intersection 68 shown in FIG. 9 on the display unit 15.

Note that when the user completes answering a predetermined number of questions (that is, when the lowest node is set as the current node), the search result screen display control unit 76 may automatically display the search result screen on the display unit 15.

Below, processing that is executed in the terminal device 10 to implement the above described selection screen display control unit 72, current node changing unit 74, and search result screen display control unit 76 will be described. FIG. 12 is a flowchart showing one example of processing that is executed in the terminal device 10 when any option is selected in the question screen. The control unit 11 of the terminal device 10 executes the processing shown in FIG. 12 according to a program, to thereby function as the selection screen display control unit 72, the current node changing unit 74, and the search result screen display control unit 76.

When any option is selected in a question screen, the control unit 11 (the current node changing unit 74) updates the current node information, as shown in FIG. 12 (S101). That is, the control unit 11 sets the node 50 corresponding to the option selected by the user among the lower nodes 50 positioned immediately below the current node, as a new current node. For example, when the option [1] is selected in the question screen [1-1] shown in FIG. 7, the control unit 11 updates the current node information such that the node [1-1-1] is set as the current node.

After execution of step S101, the control unit 11 determines whether or not the node 50 that is newly set as the current node is the lowest nodes (S102). When it is not determined that the node 50 that is newly set as the current node is the lowest nodes, the control unit 11 obtains a search result (the number of hits) corresponding to the current node (S103). This processing is executed to display the hit number area 30 of the question screen.

At step S103, the control unit 11 obtains the search condition corresponding to the node from the top node to the current node, based on the search condition data, and inquires of the server 4 the number of products satisfying the search condition. For example, when the node [1-1] is set as the current node, the control unit 11 inquires of the server 4 the number of products belonging to the intersection 64 shown in FIG. 8. Having received the inquiry, the server 4 accesses the database 6 to obtain the number of products satisfying the above-described search condition, and sends the number to the terminal device 10.

Further, the control unit 11 obtains a search result corresponding to the node correlated to the option [1] of the current node among the lower nodes 50 positioned immediately below the current node (S104). This processing is performed to display the pre-presentation area 24A.

At step S104, the control unit 11 obtains the search condition corresponding to the nodes from the top node to the above-described lower node, based on the search condition data, and requests of the server 4 for a list of products satisfying the search condition. For example, when the node [1-1] is set as the current node, the control unit requests of the server 4 for a list of products belonging to the intersection 68 shown in FIG. 9.

Having received the above-described request, the server 4 accesses the database 6 to obtain a list of products satisfying the above-described search condition, and sends the list to the terminal device 10. Note that in this embodiment, as only three products are shown in the pre-presentation area 24A, the server 4 may send the list of the three products among the products satisfying the above-described search condition to the terminal device 10.

Further, the control unit 11 obtains a search result corresponding to the node correlated to the option [2] of the current node among the lower nodes 50 positioned immediately below the current node (S105). This processing is performed to display the pre-presentation area 24B, being basically similar to the processing at step S104.

Further, the control unit 11 obtains a search result corresponding to the node correlated to the option [3] of the current node among the lower nodes 50 positioned immediately below the current node (S106). This processing is performed to display the pre-presentation area 24C, being basically similar to the processing at step S104.

After execution of the processing at steps S103 to S106, the control unit 11 (the selection screen display control unit 72)

updates the question screen (S106). In this case, the control unit 11 displays the question correlated to the node 50 that is newly set as the current node in the question area 20. Further, the control unit 11 displays the options [1], [2], [3] correlated to the node 50 that is newly set as the current node in the respective option areas 22A, 22B, 22C. Further, the control unit 11 displays the number of hits obtained at step S103 in the hit number area 30. Further, the control unit 11 displays the thumbnail image 26 of the product in the pre-presentation area 24A, based on the result obtained at step S104. Similarly, the control unit 11 displays the thumbnail image 26 of the product in the pre-presentation area 24B, based on the result obtained at step S105, and the thumbnail image 26 of the product in the pre-presentation area 24C, based on the result obtained at step S106.

Note that when it is determined at step S102 that the node 50 newly set as the current node is the lowest node, the control unit 11 obtains a search result corresponding to the current node (S108). That is, the control unit 11 obtains the search condition corresponding to the nodes from the top node to the current node, based on the search condition data, and inquires of the server 4 for a list of products satisfying the search condition. Then, the control unit 11 (the search result screen display control unit 76) displays the search result screen on the display unit 15, based on the list of products sent form the server 4 (S109). With the above, the description on the processing shown in FIG. 12 is completed.

According to the search system 1 described above, with provision of the above described pre-presentation areas 24A, 24B, 24C in the question screen, the user can know in advance a product that will be listed as a recommended product when an option is selected. Then, the user can select an option, referring to the product as a hint. For example, although the user may not be able to decide which option to select in a case of some question or option, the search system 1 enables the user to decide which option to select with reference to the pre-presentation areas 24A, 24B, 24C. That is, the search system 1 makes it possible to assist the user so as to readily select an option.

Note that the present invention is not limited to the above-described embodiment.

(1) For example, only a product unique to a case where the option in the option area 22A is selected may be shown in the pre-presentation area 24A.

"The product unique to a case where the option in the option area 22A is selected" refers to a product that is listed as the recommended product when the user selects the option in the option area 22A and that is not listed as the recommended product when the user selects the option in the option area 22B or 22C.

Figures 13, 14:
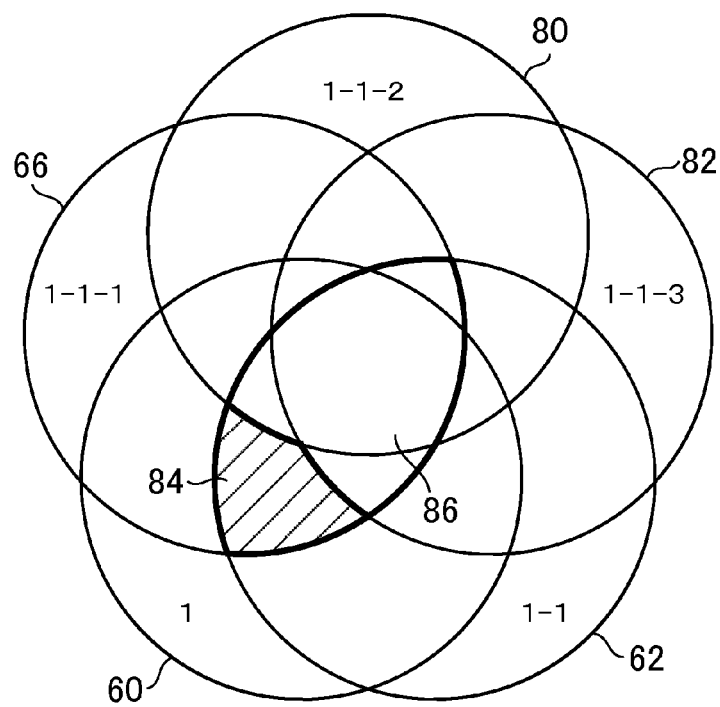
FIG. 13 explains one example of a search result that is shown in a pre-presentation area in the question screen [1-1]
FIG. 14 explains one example of product list data.

FIG. 13 explains a product unique to a case where the option in the option area 22A of the question screen [1-1] is selected. The reference numeral "80" in FIG. 13 refers to a set of products satisfying the search condition correlated to the node [1-1-2], and "82" to a set of products satisfying the search condition correlated to the node [1-1-3].

As shown in FIG. 13, the product unique to the case where the option in the option area 22A of the question screen [1-1] is selected refers to a product belonging to the set 84 obtained by excluding the sets 80, 82 from the intersection of the sets 60, 62, 66 (the intersection 68 in FIG. 9). That is, the product unique to the case where the option in the option area 22A of the question screen [1-1] is selected refers to a product satisfying the search conditions correlated to the respective nodes [1], [1-1], [1-1-1] but not either the search condition correlated to the node [1-1-2] or the search condition correlated to the lower node [1-1-3].

Below, the selection screen display control unit 72 in case of displaying in the pre-presentation area 24A only a product unique to the case where the option in the option area 22A is selected will be described. In this case, the selection screen display control unit 72 outputs, so as to be correlated to each of a plurality of lower node information items, a display concerning "a list of information items satisfying a search condition corresponding to the nodes from the top node to a lower node corresponding to the lower node information item but not a search condition corresponding to the other(s) among the plurality of lower nodes". For example, the selection screen display control unit 72 displays a thumbnail image 26 of a product belonging to the set 84 shown in FIG. 13 in the pre-presentation area 24A of the question screen [1-1].

Below, processing for displaying in the pre-presentation area 24A only a product unique to the case where the option in the option area 22A is selected will be described. In this case, the control unit 11 executes processing to be described below at step S104 in FIG. 12. A node 50 correlated to the option [1] among the lower nodes 50 positioned immediately below the current node will be hereinafter referred to as a lower node [1]. Similarly, a node 50 correlated to the option [2] will be hereinafter referred to as a lower node [2], and a node 50 correlated to the option [3] as a lower node [3].

At step S104, the control unit 11 obtains the search condition corresponding to the nodes from the top node to the lower node [1], based on the search condition data. Further, the control unit 11 obtains the search condition corresponding to each of the other lower nodes among the lower nodes positioned immediately below the current node, based on the search condition data. That is, the control unit 11 obtains the search condition corresponding to the lower node [2] and the search condition corresponding to the lower node [3].

Then, the control unit 11 requests the server 4 for a list of products satisfying the search condition corresponding to the nodes from the top node to the lower node [1] but not the search condition corresponding to the other(s). That is, the control unit 11 requests the server 4 for a list of products satisfying the search condition corresponding to the nodes from the top node to the lower node [1] but not either the search condition corresponding to the lower node [2] or the search condition corresponding to the lower node [3].

For example, when the node [1-1] is set as the current node (that is, the question screen [1-1] is displayed), the control unit 11 requests the server 4 for a list of products satisfying the search conditions correlated to the respective nodes [1], [1-1], [1-1-1] but not either the search condition correlated to the node [1-1-2] or the search condition correlated to the node [1-1-3] (the set 84 in FIG. 13). Having received the above-described request, the server 4 accesses the database 6 to obtain a list of products satisfying the above-described search condition, and sends the product list to the terminal device 10. Thereafter, at step S107, the pre-presentation area 24A is updated based on the product list sent from the server 4.

In the above described manner, as only a product unique to the case where the option in the option area 22A is selected is shown in the pre-presentation area 24A, the user can more readily decide whether or not to select the option in the option area 22A.

Note that as to the pre-presentation area 24B as well, only a product unique to the case where the option in the option area 22B is selected may be shown. Further, as to the pre-presentation area 24C as well, only a product unique to the case where the option in the option area 22C is selected may be shown.

(2) For example, a product unique to the case where the option in the option area 22A is selected may be shown with priority in the pre-presentation area 24A.

Below, processing for showing with priority in the pre-presentation area 24A a product unique to the case where the option in the option area 22A is selected will be described. In this case, the control unit 11 executes the processing to be described below at steps S104 and S107 in FIG. 12.

At step S104, the control unit 11 obtains the search condition corresponding to the nodes from the top node to the lower node [1], based on the search condition data, and requests the server 4 for a list of products satisfying the search condition. For example, when the node [1-1] is set as the current node (that is, when the question screen [1-1] is displayed), the control unit 11 requests the server 4 for a list of products satisfying the search condition corresponding to the nodes from the top node to the node [1-1-1] (the intersection of the sets 60, 62, 66 in FIG. 13).

Having received the above-described request, the server 4 accesses the database 6 to obtain a list of products satisfying the above-described search condition, and sends the product list to the terminal device 10. The control unit 11 (the obtaining means) receives the product list sent from the server 4, and stores the product list in the main memory unit 12 (or the auxiliary storage unit 13).

FIG. 14 shows one example of the product list data stored in the main memory unit 12 (or the auxiliary storage unit 13). The product list obtained from the server 4 for the pre-presentation area 24A is held in the product list data shown in FIG. 14. For example, when the node [1-1] is set as the current node (that is, when the question screen [1-1] is displayed), the list of products belonging to the intersection of the sets 60, 62, 66 shown in FIG. 13 is held in the product list data shown in FIG. 14.

The product list data shown in FIG. 14 includes "product ID", "name", "price", "category", "image", and "display priority" fields. The "product ID" field indicates identification information (a product ID) for uniquely identifying a product. The "name", "price", and "category" fields indicate the name, price, and category of a product, respectively. The "image" field indicates link information to a image (for example, a thumbnail image) of a product.

The "display priority" field indicates a priority in displaying in the pre-presentation area 24A. For example, the "display priority" field takes a value "1" or "2". These values indicate a priority display order, with a smaller value indicating a higher display order (that is, a higher display priority). The control unit 11 (the priority setting means) sets a value for the "display priority" field. Specifically, the control unit 11 sets the display priority of a product satisfying the search condition corresponding to a lower node other than the lower node [1] lower than that of a product not satisfying the search condition corresponding to the lower node other than the lower node [1]. For example, the control unit 11 sets the display priority of the product satisfying the search condition corresponding to the lower node other than the lower node [1] to "2", and the display priority of the product not satisfying the search condition corresponding to the lower node other than the lower node [1] to "1".

For example, when the node [1-1] is set as the current node (that is, the when question screen [1-1] is displayed), the control unit 11 sets the display priority of a product satisfying the search condition corresponding to the node [1-1-2] to "2". Further, the control unit 11 sets the display priority of a product satisfying the search condition corresponding to the node [1-1-3] as well to "2". That is, the control unit 11 sets the display priority of the product belonging to the set 86 shown in FIG. 13 to "2". Further, the control unit 11 sets the display priority of a product other than the above-described products to "1". That is, the control unit 11 sets the display priority of the product belonging to the set 84 shown in FIG. 13 to "1".

At step S107, the control unit 11 displays in the pre-presentation area 24A a product held in the product list data obtained at step S104, based on the display priority of the product held in the product list data. For example, the control unit 11 sorts the list of products held in the product list data in order of higher display priority, and displays in the pre-presentation area 24A three products in order of higher display priority. In a case where the product displayed in the pre-presentation area 24A is changed as time passes, products may be displayed sequentially in the pre-presentation area 24A in order of higher display priority.

In this case, as the display priority of the product belonging to the set 84 shown in FIG. 13 is set higher than that of the product belonging to the set 86, the product belonging to the set 84 is displayed in the pre-presentation area 24B prior to the product belonging to the set 86.

Figures 15, 16:
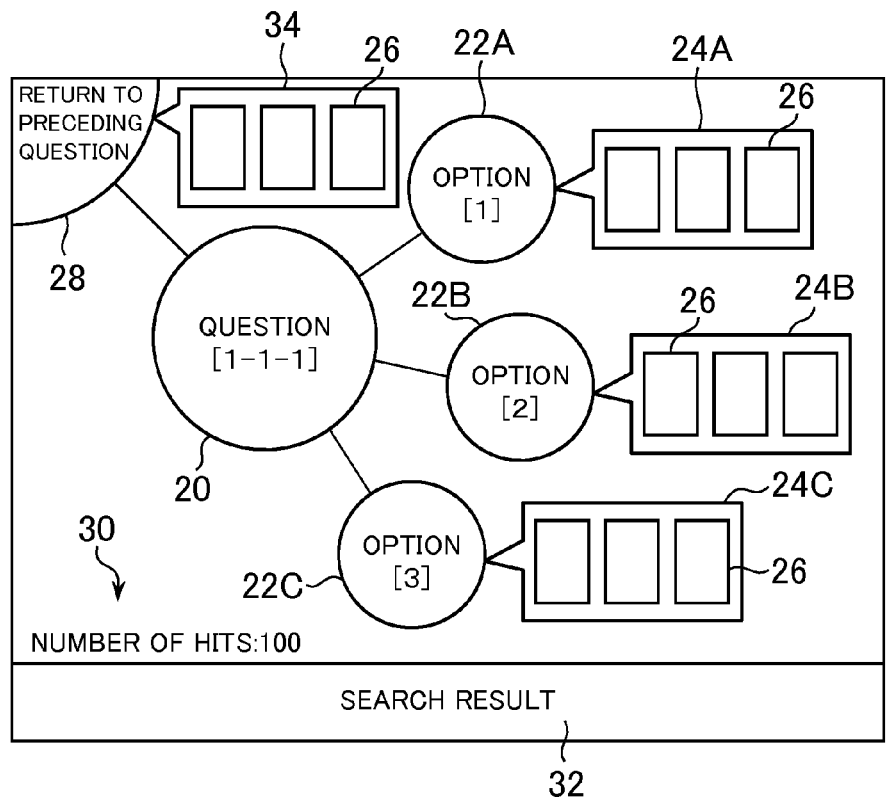
FIG. 15 explains another example of product list data.
FIG. 16 shows one example of the question screen [1-1-1]

Note here that the control unit 11 may hold product list data shown in FIG. 15, for example, in the main memory unit 12 (or the auxiliary storage unit 13) at step S104, instead of the product list data shown in FIG. 14. The product list data shown in FIG. 15 differs from the product list data shown in FIG. 14 in that the former does not include the "display priority" field.

In this case, at step S104, the control unit 11 (the obtaining means) requests the server 4 for a list of products satisfying the search condition corresponding to the nodes from the top node to the lower node [1] but not either the search condition corresponding to the lower node [2] or the search condition corresponding to the lower node [3]. For example, in displaying the question screen [1-1] (that is, when the node [1-1] is set as the current node), the control unit 11 requests the server 4 for a list of products (the set 84 in FIG. 13) satisfying the search condition corresponding to the nodes from the top node to the node [1-1-1] but not either the search condition corresponding to the node [1-1-2] or the search condition corresponding to the lower node [1-1-3]. Then, the control unit 11 (the priority setting means) stores the product list sent from the server 4 as product list data in the main memory unit 12 (or the auxiliary storage unit 13). The obtained product list corresponds to the part (a) shown in FIG. 15.

Thereafter, the control unit 11 (the obtaining means) requests the server 4 for a list of products satisfying the search condition corresponding to the nodes from the top node to the lower node [1] and also at least one of the search condition corresponding to the lower node [2] and the search condition corresponding to the lower node [3]. For example, in displaying the question screen [1-1] (that is, when the node [1-1] is set as the current node), the control unit 11 requests the server 4 for a list of products (the set 86 in FIG. 13) satisfying the search conditions corresponding to the nodes from the top node to the node [1-1-1] and also at least one of the search condition corresponding to the node [1-1-2] and the search condition corresponding to the node [1-1-3]. Then, the control unit 11 (the priority setting means) adds the product list to the end of the product list data held in the main memory unit 12 (or the auxiliary storage unit 13). Note that the added product list corresponds to the part (b) shown in FIG. 15.

In the product list data shown in FIG. 15, the order of records corresponds to the display priority. Thus, at step S107, the control unit 11 displays the products held in the product list data obtained at step S104 in the pre-presentation area 24A, based on the order of records in the product list data. For example, the control unit 11 displays in the pre-presentation area 24A the products held in the respective records from the head record to the third record in the product list data. In this case, the product belonging to the set 84 shown in FIG. 13 is displayed in the pre-presentation area 24B prior to the product belonging to the set 86.

In the manner described above, as a product unique to the case where the option in the option area 22A is selected is displayed with priority in the pre-presentation area 24A, a user can more readily decide whether or not to select the option in the option area 22A.

Note that as to the pre-presentation area 24B as well, a product unique to the case where the option in the option area 22B is selected may be displayed with priority. Further, as to the pre-presentation area 24C as well, a product unique to the case where the option in the option area 22C is selected may be displayed with priority.

(3) For example, a pre-presentation area may be provided not only to a lower node but also to an upper node positioned immediately above the current node (that is, the parent node 50 of the current node).

FIG. 16 shows one example of a question screen displayed in this case. Note that FIG. 16 shows the question screen [1-1-1]. For brevity of description, specific content of a question and an option is not shown in FIG. 16.

A pre-presentation area 34 is provided in the question screen shown in FIG. 16. The pre-presentation area 34 is displayed so as to be correlated to the return area 28. In the example shown in FIG. 16, the pre-presentation area 34 has a balloon shape, similar to the pre-presentation areas 24A, 24B, 24C.

The pre-presentation area 34 has a function for allowing a user to check what kind of products are listed as recommended products in the one-preceding question screen before the user's returning to the one-preceding question screen. That is, at least one of the products listed as recommended products in the one-preceding question screen is shown in the pre-presentation area 34.

(3-1) When a user is not fond of a product listed as a recommended product in the current question screen [1-1-1], the user is expected to return to the one-preceding question screen [1-1] from the current question screen [1-1-1]. Thus, it is meaningless to show in the pre-presentation area 34 the product listed as a recommended product in the current question screen [1-1-1]. Therefore, preferably, the product that is listed as a recommended product in the current question screen [1-1-1] is excluded from the products shown in the pre-presentation area 34.

Figure 17:
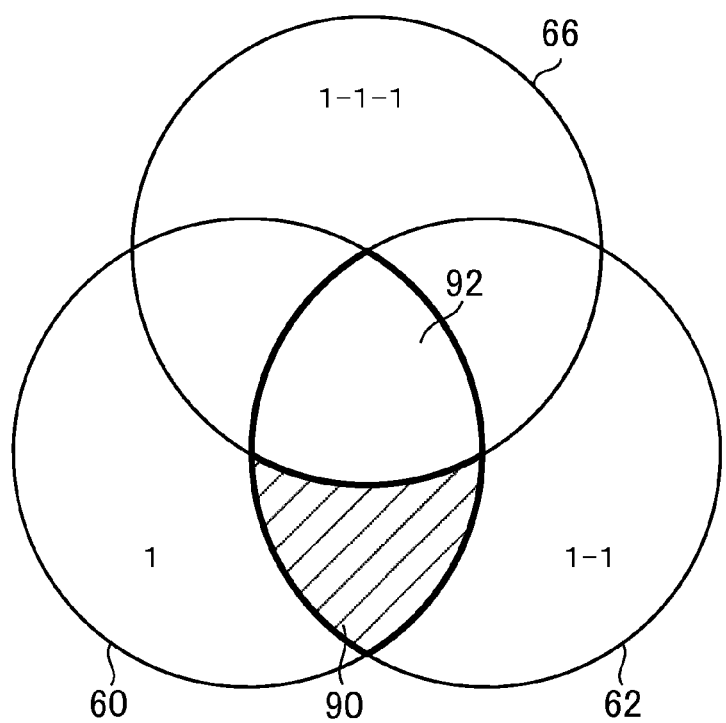
FIG. 17 explains one example of a search result that is shown in a pre-presentation area in the question screen [1-1-1]

For example, in the pre-presentation area 34 of the question screen [1-1-1] shown in FIG. 16, preferably, only the product belonging to the set 90 (the diagonally lined part) obtained by excluding the set 66 from the intersection of the sets 60, 62 (the intersection 64 in FIG. 8) is shown, as shown in FIG. 17. That is, preferably, only the product satisfying the search conditions correlated to the nodes [1], [1-1] but not the search condition correlated to the node [1-1-1] is shown.

In this case, the selection screen display control unit 72 outputs, so as to be correlated to the upper node information corresponding to the upper node positioned immediately above the current node (that is, the parent node 50 of the current node), a display concerning "a list of information items satisfying the search condition corresponding to the nodes from the top node to the above-described upper node but not the search condition corresponding to the current node". For example, the selection screen display control unit 72 outputs a display concerning the above-described information list so as to be correlated to the image information corresponding to the upper node (upper node image information).

In a case of the question screen shown in FIG. 16, caption information (caption) added to the return area 28 corresponds to the "upper node information", and the return area 28 corresponds to the "upper node image information".

Below, processing for displaying the question screen [1-1-1] shown in FIG. 16 will be described. In this case, it is necessary to execute processing for obtaining a product list to be shown in the pre-presentation area 34. This processing is executed before executing the processing at step S107 in FIG. 12.

For example, the control unit 11 requests the server 4 for a list of products satisfying the search conditions correlated to the respective nodes [1], [1-1] but not the search condition correlated to the node [1-1-1] to obtain the list of the products (the set 90 in FIG. 17). Then, at step S107, the control unit 11 shows three products of the product list obtained from the server 4 in the pre-presentation area 34. With the above, only the product belonging to the set 90 shown in FIG. 17 is shown in the pre-presentation area 34.

Note here that processing for showing only a product belonging to the set 90 shown in FIG. 17 in the pre-presentation area 34A is not limited to the processing described above.

For example, when the question screen [1-1] is initially displayed, the control unit 11 obtains a list of products satisfying the search condition corresponding to the nodes from the top node to the node [1-1], that is, the search conditions correlated to the nodes [1], [1-1] (the intersection of the sets 60, 62 in FIG. 17). Then the control unit 11 stores the list of products in the auxiliary storage unit 13.

Thereafter, upon shift from the question screen [1-1] to the question screen [1-1-1], the control unit 11 obtains a list of products belonging to the set 90 shown in FIG. 17 by excluding the product satisfying the search condition correlated to the node [1-1-1] (the set 66 in FIG. 17) from the above-described list of products (the intersection of the sets 60, 62 in FIG. 17) stored in the auxiliary storage unit 13. In this manner, the control unit 11 may show only the product belonging to the set 90 shown in FIG. 17 in the pre-presentation area 34 of the question screen [1-1-1].

Note that when the question screen [1-1] is initially displayed, a list of products satisfying the search condition corresponding to the nodes from the top node to the node [1-1] (the intersection of the sets 60, 62 in FIG. 17) may be stored in the auxiliary storage unit of the server 4 or the database 6.

Then, upon shift from the question screen [1-1] to the question screen [1-1-1], the control unit 11 may obtain the above-described list of products (the intersection of the sets 60, 62 shown in FIG. 17) stored in the server 4 or the database 6, and excludes the product satisfying the search condition correlated to the node [1-1-1] (the set 66 shown in FIG. 17) from the obtained list of products. In this manner, the control unit 11 may obtain a list of products belonging to the set 90 shown in FIG. 17.

The server 4 may obtain a list of products belonging to the set 90 shown in FIG. 17 by excluding the product satisfying the search condition correlated to the node [1-1-1] (the set 66 shown in FIG. 17) from the above-described list of products (the intersection of the sets 60, 62 shown in FIG. 17) stored in the auxiliary storage unit of the server 4 or the database 6, and sends the obtained list of products to the terminal device 10.

(3-2) In the question screen [1-1-1] shown in FIG. 16, the product belonging to the set 90 shown in FIG. 17 may be shown with priority in the pre-presentation area 34, rather than limiting a product shown in the pre-presentation area 34 to the product belonging to the set 90 shown in FIG. 17.

Below, processing for showing with priority the product belonging to the set 90 shown in FIG. 17 in the pre-presentation area 34 of the question screen [1-1-1] shown in FIG. 16 will be described.

In this case, the control unit 11 executes processing described below before executing the processing at step S107 in FIG. 12. That is, the control unit 11 requests the server 4 for a list of products satisfying the search condition corresponding to the nodes from the top node to the upper node. For example, in displaying the question screen [1-1-1] (that is, when the node [1-1-1] is set as the current node), the control unit 11 requests the server 4 for a list of products satisfying the search conditions correlated to the respective nodes [1], [1-1] (the intersection of the sets 60, 62 in FIG. 17). Then, the control unit 11 receives the list of products sent from the server 4, and holds the received list of products in the main memory unit 12 (or the auxiliary storage unit 13) as product list data in a format such as is shown in FIG. 14.

Thereafter, in the product list data, the control unit 11 (the priority setting means) sets the display priority of a product satisfying the search condition correlated to the current node lower than that of a product not satisfying the search condition correlated to the current node. For example, in displaying the question screen [1-1-1] (that is, when the node [1-1-1] is set as the current node), the control unit 11 sets the display priority of a product satisfying the search condition correlated to the node [1-1-1] (the set 92 in FIG. 17) to "2" and that of a product not satisfying the search condition correlated to the node [1-1-1] (the set 90 in FIG. 17) to "1".

Further, at step S107 in FIG. 12, the control unit 11 shows a product held in the product list data in the pre-presentation area 34, based on the display priority of each product held in the product list data. For example, the control unit 11 sorts the list of products held in the product list data in order of higher display priority, and shows three products in order of higher display priority in the pre-presentation area 34. In this case, as the display priority of the product belonging to the set 90 shown in FIG. 17 is set higher than that of the product belonging to the set 92, the product belonging to the set 90 is shown in the pre-presentation area 34 prior to the product belonging to the set 92.

Note that processing for preferentially showing a product belonging to the set 90 shown in FIG. 17 in the pre-presentation area 34 of the question screen [1-1-1] shown in FIG. 16 is not limited to the above-described processing. The control unit 11 may execute processing described below.

That is, the control unit 11 requests the server 4 for a list of products satisfying the search condition corresponding to the nodes from the top node to the upper node but not the search condition correlated to the current node before executing the processing at step S107 in FIG. 12. For example, in displaying the question screen [1-1-1] (that is, when the node [1-1-1] is set as the current node), the control unit 11 requests the server 4 for a list of products satisfying the search conditions correlated to the respective nodes [1], [1-1] but not the search condition correlated to the node [1-1-1] (the set 90 shown in FIG. 17). Then, the control unit 11 (the priority setting means) receives the list of products sent from the server 4, and stores the received list of products in the main memory unit 12 (or the auxiliary storage unit 13) as product list data in a format such as is shown in FIG. 15. In this case, the obtained list of products corresponds to the part (a) shown in FIG. 15.

Thereafter, the control unit 11 requests the server 4 for a list of products satisfying the search condition corresponding to the nodes from the top node to the current node. For example, in displaying the question screen [1-1-1] (that is, when the node [1-1-1] is set as the current node), the control unit 11 requests the server 4 for a list of products satisfying the search conditions correlated to the respective nodes [1], [1-1], [1-1-1] (the set 92 in FIG. 17). Then, the control unit 11 (the priority setting means) receives the list of products sent from the server 4, and adds the received list of products to the end of the product list data. The added list of products corresponds to the part (b) shown in FIG. 15.

In this case, the order of records in the product list data corresponds to the display priority. Thus, at step S107 in FIG. 12, the control unit 11 shows the products held in the product list data in the pre-presentation area 34 according to the order of records in the product list data. For example, the control unit 11 shows in the pre-presentation area 34 the products held in three respective records from the head record to the third record in the product list data. In this case, the product belonging to the set 90 shown in FIG. 17 is shown in the pre-presentation area 34 prior to the product belonging to the set 92.

(4) As described above, when a user is not fond of the product listed as a recommended product in the current question screen, the user is expected to return to the one-preceding question screen from the current question screen. When the screen returns to the one-preceding screen, the pre-presentation areas 24A, 24B, 24C may be shown taking this fact into consideration.

Below, assume a case in which the screen returns from the question screen [1-1-1] to the question screen [1-1] (FIG. 7).

Figure 18:
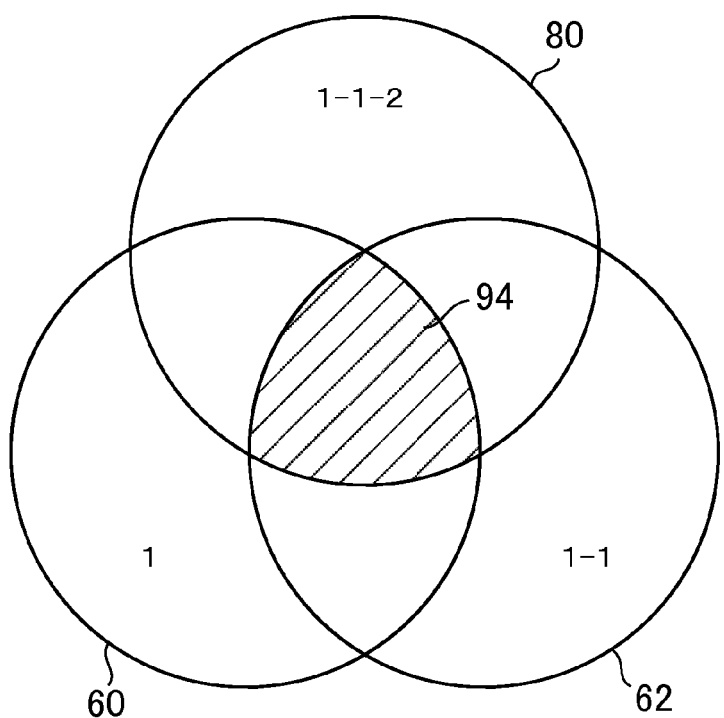
FIG. 18 explains one example of a search result that is shown in the pre-presentation area in the question screen [1-1]

(4-1) Generally, a product satisfying the search condition corresponding to the nodes from the top node to the node [1-1-2] is shown in the pre-presentation area 24B of the question screen [1-1]. That is, a product belonging to the intersection 94 (the diagonally lined part) of the sets 60, 62, 80 is shown in the pre-presentation area 24B, such as is shown in FIG. 18, for example.

However, when the screen returns from the question screen [1-1-1] to the question screen [1-1], only a product satisfying the search condition corresponding to the nodes from the top node to the node [1-1-2] but not the search condition correlated to the node [1-1-1] may be shown in the pre-presentation area 24B. For example, only the product belonging to the set 96 (the diagonally lined part) obtained by excluding the set 66 from the intersection of the sets 60, 62, 80 (the intersection 94 in FIG. 18) may be shown in the pre-presentation area 24B, as shown in FIG. 19, for example.

When the screen returns from the question screen [1-1-1] to the question screen [1-1], processing similar to that shown in FIG. 12 is executed. In this case, at step S105, the control unit 11 requests the server 4 for a list of products satisfying the search condition corresponding to the nodes from the top node to the node [1-1-2] but not the search condition correlated to the node [1-1-1] (the set 96 in FIG. 17) to obtain the list of the products. Then, at step S107, the control unit 11 shows three products of the product list obtained from the server 4 in the pre-presentation area 24B. With the above, only the product belonging to the set 96 shown in FIG. 19 is shown in the pre-presentation area 24B.

Figure 19:
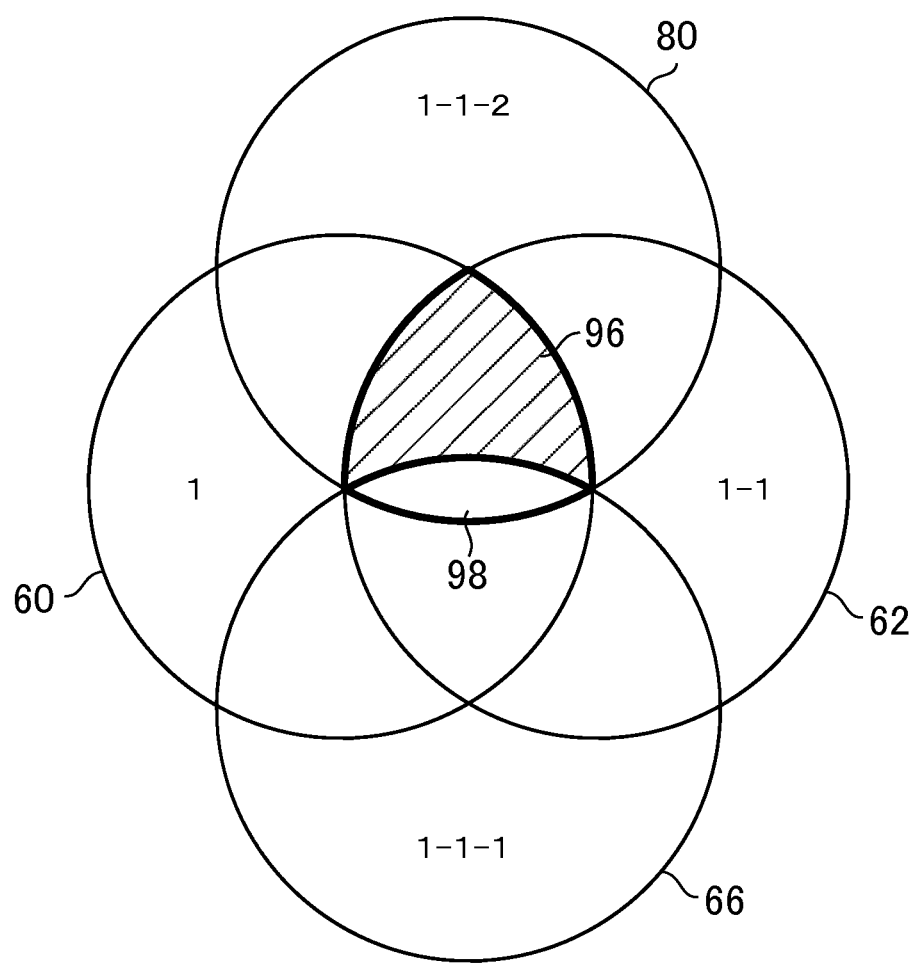
FIG. 19 explains one example of a search result that is shown in the pre-presentation area in the question screen [1-1].

Note that processing for showing only the product belonging to the set shown in FIG. 19 in the pre-presentation area 24B when the screen returns from the question screen [1-1-1] to the question screen [1-1] is not limited to the above-described processing.

For example, when the question screen [1-1] is initially shown, the control unit 11 obtains a list of products satisfying the search condition corresponding to the nodes from the top node to the node [1-1-2] (the intersection of the sets 60, 62, 80 in FIG. 19). Then, the control unit 11 stores the list of products in the auxiliary storage unit 13. Thereafter, when the user shifts from the question screen [1-1] to the question screen [1-1-1] and then returns to the question screen [1-1], the control unit 11 obtains a list of products belonging to the set 96 shown in FIG. 19 by excluding the product satisfying the search condition correlated to the node [1-1-1] (the set 66 in FIG. 19) from the above-described list of products (the intersection of the sets 60, 62, 80 in FIG. 19) stored in the auxiliary storage unit 13. The control unit 11 may show only the product obtained as described above in the pre-presentation area 24B.

Note that when the question screen [1-1] is initially displayed, a list of products satisfying the search condition corresponding to the nodes from the top node to the node [1-2] (the intersection of the sets 60, 62, 80 in FIG. 19) may be stored in the auxiliary storage unit of the server 4 or the database 6.

Then, when the screen displayed on the display unit 15 is changed from the question screen [1-1] to the question screen [1-1-1] and then is returned to the question screen [1-1], the control unit 11 obtains the above-described list of products (the intersection of the sets 60, 62, 80 in FIG. 19) stored in the server 4 or the database 6, and excludes the product satisfying the search condition correlated to the node [1-1-1] (the set 66 in FIG. 19) from the obtained list of products. In the above described manner, the control unit 11 may obtain a list of products belonging to the set 96 shown in FIG. 19.

Note that the server 4 may obtain a list of products belonging to the set 96 shown in FIG. 19 by excluding the product satisfying the search condition correlated to the node [1-1-1] (the set 66 in FIG. 19) from the above-described list of products (the intersection of the sets 60, 62, 80 in FIG. 19) stored in the auxiliary storage unit of the server 4 or the database 6, and send the obtained list of products to the terminal device 10.

Note that as to the pre-presentation area 24C as well, basically, processing similar to that for the pre-presentation area 24B is executed. In this manner, it is possible to avoid showing a product which seems not to be fond of by the user in the pre-presentation areas 24B, 24C.

(4-2) When the screen returns from the question screen [1-1-1] to the question screen [1-1], a product belonging to the set 96 shown in FIG. 19 may be shown preferentially in the pre-presentation area 24B, rather than limiting a product shown preferentially in the pre-presentation area 24B to the product belonging to the set 96 shown in FIG. 19.

Below, processing for preferentially showing a product belonging to the set 96 shown in FIG. 19 in the pre-presentation area 24B when the screen returns from the question screen [1-1-1] to the question screen [1-1] will be described. In this case, the control unit 11 executes processing described below at steps S105, S107 in FIG. 12.

That is, at step S105, the control unit 11 requests the server for a list of products satisfying the search condition corresponding to the node from the top node to the node [1-1-2] (the intersection of the sets 60, 62, 80 in FIG. 19). Then, the control unit 11 receives the list of products sent from the server 4, and holds the received list of products in the main memory unit (or the auxiliary storage unit 13) as product list data in a format shown in FIG. 14. Further, the control unit 11 (the priority setting means) sets the display priority of a product satisfying the search condition correlated to the node [1-1-1] (the set 98 in FIG. 19) lower than that of a product not satisfying the search condition correlated to the node [1-1-1] (the set 96 in FIG. 19) in the product list data. That is, the control unit 11 sets the display priority of a product satisfying the search condition correlated to the node [1-1-1] to "2" and that of a product not satisfying the search condition correlated to the node [1-1-1] to "1".

At step S107, the control unit 11 shows a product held in the product list data in the pre-presentation area 24B, based on the display priority of each product held in the product list data. For example, the control unit 11 sorts the list of products held in the product list data in order of higher display priority, and shows three products in order of higher display priority in the pre-presentation area 24B. In this case, as the display priority of the product belonging to the set 96 shown in FIG. 19 is set higher than that of the product belonging to the set 98, the product belonging to the set 96 is shown in the pre-presentation area 24B prior to the product belonging to the set 98.

Note that the control unit 11 may execute processing described below at steps S105, S107.

That is, the control unit 11 requests the server 4 for a list of products satisfying the search condition corresponding to the nodes from the top node to the node [1-1-2] but not the search condition corresponding to the node [1-1-1] (the set 96 in FIG. 19). Then, the control unit 11 (the priority setting means) receives the list of products sent from the server 4, and holds the list of products as product list data in the main memory unit 12 (or the auxiliary storage unit 13) in a format shown in FIG. 15. In this case, the obtained list of products corresponds to the part (a) in FIG. 15.

Thereafter, the control unit 11 requests the server 4 for a list of products satisfying the search condition corresponding to the nodes from the top node to the node [1-1-2] and also the search condition corresponding to the node [1-1-1] (the set 98 in FIG. 19). Then, the control unit 11 (the priority setting means) receives the list of products sent from the server 4, and adds the received list of products to the end of the product list data. The added list of products corresponds to the part (b) in FIG. 15.

In this case, the order of records in the product list data corresponds to the display priority. Thus, at step S107, the control unit 11 shows three products among those held in the product list data in the pre-presentation area 24B, based on the order of records in the product list data. For example, the control unit 11 shows in the pre-presentation area 24B the products held in the respective records from the head record to the third record in the product list data. In this case, the product belonging to the set 96 shown in FIG. 19 is shown in the pre-presentation area 24B prior to the product belonging to the set 98.

Note that as to the pre-presentation area 24C, basically, processing similar to that for the pre-presentation area 24B is executed. In this manner, it is possible to make it unlikely to show a product that seems not to be fond of by the user in the pre-presentation areas 24B, 24C.

(4-3) Note here that the user is expected to return to the one-preceding question screen also when the user has erroneously selected an option. That is, when the question screen [1-1-1] is shown because the user has erroneously selected the option [1] in the question screen [1-1], the user should try to return from the question screen [1-1-1] to the question screen [1-1].

In such a case, preferably, normal processing is executed. That is, it is preferable not to limit a product to be shown in the pre-presentation area 24B to the product belonging to the set 96 shown in FIG. 19 or not to show such a product preferentially in the pre-presentation area 24B.

In this case, however, it is necessary to determine whether or not the user has erroneously selected the option [1] in the question screen [1-1]. In the following, two examples of a method for determining whether or not the user has erroneously selected the option [1] in the question screen [1-1] will be described.

A first example of the determination method will be described. For example, when the screen returns to the question screen [1-1] immediately after the question screen [1-1-1] is displayed, it can be understood that the user has erroneously selected the option [1] in the question screen [1-1].

That is, it is possible to determine whether or not the user has erroneously selected the option [1] in the question screen [1-1] by determining whether or not the user performs an operation for returning to the one-preceding question screen (a return instructing operation) before elapse of a reference period of time (for example, three seconds) after the question screen [1-1-1] is displayed. Note that pointing to the return area 28 corresponds to a "return instructing operation" in this embodiment.

For example, when the user points to the return area 28 before elapse of the reference period of time (for example, three seconds) after the question screen [1-1-1] is displayed, it may be determined that the user returns to the question screen [1-1] because the user has erroneously selected the option [1] in the question screen [1-1]. In such a case, a product belonging to the set 94 shown in FIG. 18 may be shown in the pre-presentation area 24B.

Meanwhile, when the user points to the return area 28 after elapse of the reference period of time (for example, three seconds) after the question screen [1-1-1] is displayed, it may be determined that the user returns to the question screen [1-1] because the user is not fond of the product shown as a recommended product in the question screen [1-1-1]. In such a case, only the product belonging to the set 96 shown in FIG. 19 may be shown in the pre-presentation area 24B or the product belonging to the set 96 shown in FIG. 19 may be shown preferentially in the pre-presentation area 24B.

A second example of the determination method will be described. When the user points to the search result area 32 of the question screen [1-1-1] to thereby refer to the search result screen, it can be understood that the user has not erroneously selected the option [1] in the question screen [1-1]. Further, when the user points to the return area 28 after referring to the search result screen, it can be understood that the user returns to the question screen [1-1] because the user is not fond of the product listed as a recommended product in the question screen [1-1].

That is, whether or not the user has erroneously selected the option [1] in the question screen [1-1] may be determined by determining whether or not the user points to the return area 28 after referring to the search result screen.

For example, when the user points to the return area 28 before referring to the search result screen, it may be determined that the user returns to the question screen [1-1] because the user has erroneously selected the option [1] in the question screen [1-1]. In such a case, the product belonging to the intersection 94 shown in FIG. 18 may be shown in the pre-presentation area 24B.

Meanwhile, when the user points to the return area 28 after referring to the search result screen, it may be determined that the user returns to the question screen [1-1] because the user is not fond of the product listed as a recommended product in the question screen [1-1-1]. In this case, only the product belonging to the set 96 shown in FIG. 19 may be shown in the pre-presentation area 24B or the product belonging to the set 96 shown in FIG. 19 may be shown preferentially in the pre-presentation area 24B.

(5) As described above, the user is expected to return to the one-preceding question screen from the current question screen when the user is not fond of the product listed as a recommended product in the current question screen. Therefore, when the user returns to the one-preceding question screen, the search result screen may be shown taking this fact into consideration.

In the following, assume a case in which the question screen [1-1-2] is displayed because the user returns from the question screen [1-1-1] to the question screen [1-1] and then selects the option [2] in the question screen [1-1].

(5-1) Generally, when the user points to the search result area 32 of the question screen [1-1-2], a search result screen showing a list of products satisfying the search condition corresponding to the nodes from the top node to the node [1-1-2] is displayed. That is, a search result screen showing a list of products belonging to the intersection 94 (the diagonally lined part) of the sets 60, 62, 80 shown in FIG. 18, for example, is displayed.

However, when the question screen [1-1-2] is displayed because the user selects the option [2] in the question screen [1-1] after returning from the question screen [1-1-1] to the question screen [1-1], and then points to the search result area 32 of the question screen [1-1-2], only a product satisfying the search condition corresponding to the nodes from the top node to the node [1-1-2] but not the search condition corresponding to the node [1-1-1] may be shown in the list area 40 of the search result screen. That is, only a product belonging to the set 96 (the diagonally lined part) obtained by excluding the set 66 from the intersection (the set 94 in FIG. 18) of the sets 60, 62, 80 shown in FIG. 19, for example, may be shown in the list area 40 of the search result screen. In this manner, it is possible to avoid showing a product which seems not to be fond of by the user in the search result screen.

In showing only the product belonging to the set 96 shown in FIG. 19 in the list area 40 of the search result screen, the control unit 11 executes processing described below. That is, the control unit 11 requests the server 4 for a list of products satisfying the search condition corresponding to the nodes from the top node to the node [1-1-2] but not the search condition corresponding to the node [1-1-1] (the set 96 in FIG. 19) to obtain the list of the products. Then, the control unit 11 shows the list of products obtained from the server 4 in the list area 40 of the search result screen.

Note that, for example, when the user points to the search result area 32 of the question screen [1-1-2] that is displayed because the user has re-selected the option [2] in the question screen [1-1] after returning from the question screen [1-1-1] to the question screen [1-1], in order to show in the list area 40 of the search result screen a product different from a product normally shown in the list area 40, it is necessary to determine whether or not the question screen [1-1-2] is displayed because the user has re-selected the option [2] in the question screen [1-1] after returning from the question screen [1-1-1] to the question screen [1-1], as described above. Therefore, in this embodiment, history data on the nodes that have been set as the current node is stored, so that the above-described determination is made based on the data.

(5-2) When the user points to the search result area 32 of the question screen [1-1-2], the product belonging to the set 96 shown in FIG. 19 may be shown preferentially in the list area 40 of the search result screen, rather than limiting a product to be shown in the list area 40 to the product belonging to the set 96 shown in FIG. 19.

In preferentially showing a product belonging to the set 96 shown in FIG. 19 in the list area 40, the control unit 11 requests the server 4 for a list of products satisfying the search condition corresponding to the nodes from the top node to the node [1-1-2] (the intersection of the sets 60, 62, 80 in FIG.

19). Then, the control unit 11 receives the list of products sent from the server 4, and stores the received list of products in the main memory unit (or the auxiliary storage unit 13) as product list data in a format shown in FIG. 14. Further, in the product list data, the control unit 11 (the priority setting means) sets the display priority of a product satisfying the search condition corresponding to the node [1-1-1] (the set 98 in FIG. 19) lower than that of a product not satisfying the search condition corresponding to the node [1-1-1] (the set 96 in FIG. 19). That is, the control unit 11 sets the display priority of a product satisfying the search condition corresponding to the node [1-1-1] to "2" and that of a product not satisfying the search condition corresponding to the node [1-1-1] to "1".

Then, the control unit 11 shows a product held in the product list data in the list area 40 of the search result screen, based on the display priority of the product held in the product list data. For example, the control unit 11 sorts the list of products held in the product list data in order of higher display priority, and shows the products in order of higher display priority in the list area 40. In this case, as the display priority of the product belonging to the set 96 shown in FIG. 19 is set higher than that of the product belonging to the set 98, the product belonging to the set 96 is shown in the pre-presentation area 24B prior to the product belonging to the set 98.

Note that the control unit 11 may execute processing described below. That is, the control unit 11 requests the server 4 for a list of products satisfying the search condition corresponding to the nodes from the top node to the node [1-1-2] but not the search condition corresponding to the node [1-1-1] (the set 96 in FIG. 19). Then, the control unit 11 (the priority setting means) receives the list of products sent from the server 4, and stores the list of products as product list data in a format shown in FIG. 15 in the main memory unit 12 (or the auxiliary storage unit 13). In this case, the obtained list of products corresponds to the part (*a*) in FIG. 15.

Thereafter, the control unit 11 requests the server 4 for a list of products satisfying the search condition corresponding to the nodes from the top node to the node [1-1-2] and also the search condition corresponding to the node [1-1-1] (the set 98 in FIG. 19). Then, the control unit 11 (the priority setting means) receives the list of products sent from the server 4, and adds the list of products to the end of the product list data. The added list of products corresponds to the part (*b*) in FIG. 15.

In this case, the order of records in the product list data corresponds to the display priority. Thus, the control unit 11 shows a product held in the product list data in the list area 40 of the search result screen, based on the order of records in the product list data. For example, the control unit 11 shows the list of products held in the product list data in the list area 40, beginning with the head of the product list data. In this case, the product belonging to the set 96 shown in FIG. 19 is shown in the pre-presentation area 24B prior to the product belonging to the set 98.

In the above-described manner, it is possible to make it unlikely that a product which seems not to be fond of by the user is shown in the search result screen.

(5-3) Note here that the user is expected to return to the one-preceding question screen also when the user has erroneously selected an option. That is, also when the question screen [1-1-1] is displayed because the user has erroneously selected the option [1] in the question screen [1-1], the user should return from the question screen [1-1-1] to the question screen [1-1].

In such a case, preferably, normal processing is executed. That is, it is preferable not to limit a product to be shown in the list area 40 of the search result screen to the product belonging to the set 96 shown in FIG. 19 or not to show such a product preferentially in the list area 40. That is, when the user returns to the question screen [1-1] because the user has erroneously selected the option [1] in the question screen [1-1], preferably, the product belonging to the intersection 94 shown in FIG. 18 may be shown in the list area 40 of the search result screen. Meanwhile, when the user returns to the question screen [1-1] because the user is not fond of the product listed as a recommended product in the question screen [1-1-1], preferably, only the product belonging to the set 96 shown in FIG. 19 may be shown in the list area 40 of the search result screen or the product belonging to the set 96 shown in FIG. 19 may be shown preferentially in the list area 40 of the search result screen.

In this case, however, it is necessary to determine whether or not the option [1] is erroneously selected in the question screen [1-1]. This determination is made in a manner similar to that in the above-described modified example (4-3).

Note here that as the structure described above as the modified example (5) is not relied on the presence of the pre-presentation areas 24A, 24B, 24C, the structure described above as the modified example (5) can be employed in the search system 1 or the like without the pre-presentation areas 24A, 24B, 24C.

(6) The search condition data may be stored in the auxiliary storage unit of the server 4 or the database 6.

In this case, the control unit 11 sends the current node information to the server 4 at step S103 in FIG. 12, for example. In this case, the server 4 obtains the search condition corresponding to the nodes from the top node to the current node, based on the current node information and the search condition data. Then, the server 4 accesses the database 6 to obtain the number of products satisfying the above-described search condition, and sends the number to the terminal device 10. At steps S104 to S106 as well, similar to step S103, the control unit 11 sends the current node information to the server 4 to obtain a list of products.

(7) The selection screen display control unit 72 may be implemented using the control unit of the server 4 (an information processing device). That is, the question screen is generated by the server 4.

For example, when any option is selected in the question screen, the current node information and information indicating the option selected by the user may be sent from the terminal device 10 to the server 4. Alternatively, for example, when any option is selected in the question screen, the current node information may be updated based on the option selected by the user, and thereafter the updated current node information may be sent from the terminal device 10 to the server 4. Then, the control unit (the selection screen display control unit 72) of the server 4 may generate a web page (a question page) showing a question screen, and sends the question page to the terminal device 10 to display the question screen on the display unit 15 of the terminal device 10. Note that, in this case, the question data may be stored in the auxiliary storage unit of the server 4 or the database 6.

Further, the search result screen display control unit 76 may be implemented using the control unit of the server 4 (an information processing device). That is, the search result screen may be generated by the server 4.

For example, when the user points to the search result area 32 of a question screen, the current node information may be sent from the terminal device 10 to the server 4. Then, the control unit (the search result screen display control unit 76) of the server 4 generates a web page (a search result page) showing a search result screen, and sends the search result page to the terminal device 10 to display the search result screen on the display unit 15 of the terminal device 10.

(8) A designation unit (the operation unit 14) for the user to designate with a position in a screen shown on the display unit 15 may not be formed over the display unit 15. The designation unit (the operation unit 14) may be formed at a position apart from the display unit 15.

(9) Although a case of searching for a product is described in the above, application of the present invention is not limited to a case of searching for a product, but to a case of searching for any information other than a product.

The invention claimed is:

1. A search system, comprising:
   search condition data storage means for storing search condition data having a tree structure in which a search condition and a node are correlated with each other;
   current node information storage means for storing current node information indicating a current node being a node currently selected by a user among nodes in the tree structure;
   selection screen display control means for displaying a selection screen showing first and second lower node information items on display means, wherein said first and second lower nodes are positioned immediately below the current node;
   current node changing means for changing the current node to the first lower node or the second lower node selected depending on the selection by the user; and
   search result screen display control means for displaying a search result screen showing a list of information items satisfying a search condition corresponding to from a top node to the current node, when the user performs a display instructing operation or a lowest node is set as the current node,
   wherein
   the search system further comprises:
      first obtaining means for obtaining a first list of information items that satisfy a search condition corresponding to from the top node to the first lower node;
      first priority setting means for setting a display priority for each of the information items in the first list of information items;
      second obtaining means for obtaining a second list of information items satisfying a search condition corresponding to from the top node to the second lower node; and
      second priority setting means for setting a display priority for each of the information items in the second list of information items,
   wherein the selection screen display control means outputs at least part of the first list of information items so as to be correlated to the first lower node information item, and outputs at least part of the second list of information items so as to be correlated to the second lower node information item,
   wherein the first priority setting means sets a lower display priority for information items that satisfy a search condition corresponding to the second lower node, compared to information items that do not satisfy the search condition corresponding to the second lower node, and
   wherein the second priority setting means sets a lower display priority for information items that satisfy a search condition corresponding to the first lower node, compared to information items that do not satisfy the search condition corresponding to the first lower node.

2. The search system according to claim 1, wherein
   the selection screen display control means displays the first and second lower node information items and an upper node information item, wherein said upper node is positioned immediately above the current node,
   the current node changing means changes the current node to the upper node in the case where the user selects the upper node,
   the search system comprises obtaining means for obtaining a list of information items that satisfy a search condition corresponding to from the top node to the upper node and that do not satisfy a search condition corresponding to the current node, and
   the selection screen display control means outputs at least part of the obtained list of information items so as to be correlated to the upper node information item.

3. The search system according to claim 1, wherein
   the selection screen display control means displays the first and second lower node information items and an upper node information item, wherein said upper node is positioned immediately above the current node,
   the current node changing means changes the current node to the upper node in the case where the user selects the upper node,
   the search system comprises:
      obtaining means for obtaining a list of information items satisfying a search condition corresponding to from the top node to the upper node, and
      priority setting means for setting a display priority for each of the information items in the obtained list of information items,
   the selection screen display control means displays at least part of the obtained list of information items so as to be correlated to the upper node information item, and
   the setting means sets a lower display priority for information items that satisfy a search condition corresponding to the current node, compared to information items that do not satisfy the search condition corresponding to the current node.

4. The search system according to claim 1, wherein
   the tree structure includes the first lower node and third and fourth lower nodes positioned immediately below the first lower node,
   in the case where the first lower node is set as the current node, the selection screen includes a third lower node information item and a fourth lower node information item,
   in the case where the user selects the third lower node while the first lower node is set as the current node, the current node changing means changes the current node from the first lower node to the third lower node,
   in the case where the user performs a return instructing operation for returning the current node to the first lower node after the current node is changed from the first lower node to the third lower node, the current node changing means returns the current node from the third lower node to the first lower node, and
   in the case where the current node is returned from the third lower node to the first lower node, the selection screen display control means output, so as to be correlated to the fourth lower node information item, at least part of a list of information items that satisfy a search condition corresponding to from the top node to the fourth lower node and that do not satisfy a search condition corresponding to the third lower node.

5. The search system according to claim 4, further comprising:
   means for determining whether or not the return instructing operation is performed after elapse of a reference period of time after the current node is changed from the first lower node to the third lower node, wherein in the case where the current node is returned from the third lower node to the first lower node, the selection screen display control means outputs, so as to be correlated to the fourth lower node information item, at least part of a list of information items satisfying the search condition corresponding to from the top node to the fourth lower node, if the return instructing operation is performed before elapse of the reference period of time, and outputs, so as to be correlated to the fourth lower node information item, at least part of the list of information items that satisfy the search condition corresponding to from the top node to the fourth lower node and that do not satisfy the search condition corresponding to the third lower node, if the return instructing operation is performed after elapse of the reference period of time.

6. The search system according to claim 4, wherein in the case where the user performs the display instructing operation while the third lower node is set as the current node, the search result screen display control means displays the search result screen showing a list of information items satisfying a search condition corresponding to from the top node to the third lower node, as a search result screen corresponding to the third lower node, the search system comprises means for determining whether or not the return instructing operation is performed after the search result screen corresponding to the third lower node is displayed, and in the case where the current node is returned from the third lower node to the first lower node and, the return instructing operation is performed before the search result screen corresponding to the third lower node is displayed, the selection screen display control means outputs, so as to be correlated to the fourth lower node information item, at least part of the list of information items that satisfy the search condition corresponding to the from the top node to the fourth lower node and that do not the search condition corresponding to the third lower node.

7. The search system according to claim 1, wherein the tree structure includes the first lower node and third and fourth lower nodes positioned immediately below the first lower node, in the case where the first lower node is set as the current node, the selection screen includes a third lower node information item and a fourth lower node information item, in the case where the user selects the third lower node while the first lower node is set as the current node, the current node changing means changes the current node from the first lower node to the third lower node, in the case where the user performs a return instructing operation for returning the current node to the first lower node after the current node is changed from the first lower node to the third lower node, the current node changing means returns the current node from the third lower node to the first lower node, and the search system comprises:

fourth obtaining means for obtaining a fourth list of information items satisfying a search condition corresponding to from the top node to the fourth lower node, and fourth priority setting means for setting a display priority for each of the information items in the fourth list of information items, in the case where the current node is returned from the third lower node to the first lower node, the selection screen display control means displays at least part of the fourth list of information items so as to be correlated to the fourth lower mode information item, and in the case where the current node is returned from the third lower node to the first lower node, the fourth priority setting means sets a lower display priority for information items that satisfy a search condition corresponding to the third lower node, compared to information items that do not satisfy the search condition corresponding to the third lower node.

8. The search system according to claim 7, further comprising:

means for determining whether or not the return instructing operation is performed after elapse of a reference period of time after the current node is changed from the first lower node to the third lower node, wherein in the case where the current node is returned from the third lower node to the first lower node and it is determined that the return instructing operation is performed after elapse of the reference period of time, the fourth priority setting means sets a lower display priority for information items that satisfy the search condition corresponding to the third lower node, compared to information items that do not satisfy the search condition corresponding to the third lower node.

9. The search system according to claim 7, wherein in the case where the user performs the display instructing operation while the third lower node is set as the current node, the search result screen display control means displays the search result screen showing a list of information items satisfying a search condition corresponding to from the top node to the third lower node on the display means, as a search result screen corresponding to the third lower node, the search system comprises means for determining whether or not the return instructing operation is performed after the search result screen corresponding to the third lower node is displayed, and in the case where the current node is returned from the third lower node to the first lower node and it is determined that the return instructing operation is performed after the search result screen corresponding to the third lower node is displayed, the fourth priority setting means sets a lower display priority for information items that satisfy the search condition corresponding to the third lower node, compared to information items that do not satisfy the search condition corresponding to the third lower node.

10. The search system according to claim 1, wherein the tree structure includes the first lower node and third and fourth lower nodes positioned immediately below the first lower node, in the case where the user selects the third lower node while the first lower node is set as the current node, the current node changing means changes the current node from the first lower node to the third lower node, in the case where the user performs a return instructing operation for returning the current node to the first lower node after the current node is changed from the first lower node to the third lower node, the current node changing means returns the current node from the third lower node to the first lower node, in the case where the user selects the fourth lower node after the current node is returned from the third lower node to the first lower node, the current node changing means changes the current node from the first lower node to the fourth lower node, and in the case of displaying the search result screen on the display means after the current node is changed from the first lower node to the fourth lower node after the current node is returned from the third lower node to the first lower node, the search result screen display control means displays a search result screen showing a list of information items that satisfy a search condition corresponding to from the top node to the fourth lower node and that do not satisfy a search condition corresponding to the third lower node, as the search result screen.

11. The search system according to claim 10, further comprising:

means for determining whether or not the return instructing operation is performed after elapse of a reference period of time after the current node is changed from the first lower node to the third lower node, wherein in the case of displaying the search result screen on the display means after the current node is changed from the first lower node to the fourth lower node after the current node is returned from the third lower node to the first lower node, the search result screen display control means

[1] displays a search result screen showing a list of information items satisfying the search condition corresponding to from the top node to the fourth lower node, if the return instructing operation is performed before elapse of the reference period of time, and

[2] displays a search result screen showing the list of information items that satisfy the search condition corresponding to from the top node to the fourth lower node and that do not satisfy the search condition corresponding to the third lower node, if the return instructing operation is performed after elapse of the reference period of time.

12. The search system according to claim 10, wherein in the case where the user performs the display instructing operation while the third lower node is set as the current node, the search result screen display control means displays the search result screen showing an information item satisfying a search condition corresponding to from the top node to the third lower node on the display means, as a search result screen corresponding to the third lower node, the search system comprises means for determining whether or not the return instructing operation is performed after the search result screen corresponding to the third lower node is displayed, and in the case of displaying the search result screen on the display means after the current node is changed from the first lower node to the fourth lower node after the current node is returned from the third lower node to the first lower node, if the return instructing operation is performed after the search result screen corresponding to the third lower node is displayed, the search result screen display control means displays a search result screen showing the list of information items that satisfy the search condition corresponding to from the top node to the fourth lower node and that do not satisfy the search condition corresponding to the third lower node.

13. The search system according to claim 1, wherein the tree structure includes the first lower node and third and fourth lower nodes positioned immediately below the first lower node, in the case where the user selects the third lower node while the first lower node is set as the current node, the current node changing means changes the current node from the first lower node to the third lower node, in the case where the user performs a return instructing operation for returning the current node to the first lower node after the current node is changed from the first lower node to the third lower node, the current node changing means returns the current node from the third lower node to the first lower node, and in the case where the user selects the fourth lower node after the current node is returned from the third lower node to the first lower node, the current node changing means changes the current node from the first lower node to the fourth lower node, and the search system comprises:

fourth obtaining means for obtaining a fourth list of information items satisfying a search condition corresponding to nodes from the top node to the fourth lower node, and fourth priority setting means for setting a display priority for each of the information items in the fourth list of information items, in the case of displaying the search result screen on the display means after the current node is changed from the first lower node to the fourth lower node after the current node is returned from the third lower node to the first lower node, the search result screen display control means displays a search result screen showing the fourth list of the information items, and in the case where the current node is changed from the first lower node to the fourth lower node after the current node is returned from the third lower node to the first lower node, the fourth priority setting means sets a lower display priority for information items that satisfy a search condition corresponding to the third lower node, compared to information items that do not satisfy the search condition corresponding to the third lower node.

14. The search system according to claim 13, further comprising:

means for determining whether or not the return instructing operation is performed after elapse of a reference period of time after the current node is changed from the first lower node to the third lower node, wherein in the case where it is determined that the return instructing operation is performed after elapse of the reference period of time and the current node is changed from the first lower node to the fourth lower node after the current node is returned from the third lower node to the first lower node, the fourth priority setting means sets a lower display priority for information items that satisfy the search condition corresponding to the third lower node, compared to information items that do not satisfy the search condition corresponding to the third lower node.

15. The search system according to claim 13, wherein in the case where the user performs the display instructing operation while the third lower node is set as the current node, the search result screen display control means displays the search result screen showing a list of information items satisfying a search condition corresponding to from the top node to the third lower node on the display means, as a search result screen corresponding to the third lower node, the search system further comprises means for determining whether or not the return instructing operation is performed after the search result screen corresponding to the third lower node is displayed, and in the case where it is determined that the return instructing operation is performed after the search result screen corresponding to the third lower node is displayed and the current node is changed from the first lower node to the fourth lower node after the current node is returned from the third lower node to the first lower node, the fourth priority setting means sets a lower display priority for information items that satisfy the search condition corresponding to the third lower node, compared to information items that do not satisfy the search condition corresponding to the third lower node.

16. An information processing device, comprising:
a current node information obtaining unit for obtaining current node information stored in current node information storage storing the current node information, the current node information indicating a current node being a node currently selected by a user among nodes in a tree structure of search condition data having the tree structure in which a search condition and a node are correlated with each other;
a selection screen display controller for displaying a selection screen showing first and second lower node information items on a display, wherein said first and second lower nodes positioned immediately below the current node; and
a search result screen display controller for displaying a search result screen showing a list of information items satisfying a search condition corresponding to from a top node to the current node, when the user performs a display instructing operation or a lowest node is set as the current node,
wherein the information processing device further comprises:
first obtaining means for obtaining a first list of information items that satisfy a search condition corresponding to from the top node to the first lower node;
first priority setting means for setting a display priority for each of the information items in the first list of information items;
second obtaining means for obtaining a second list of information items satisfying a search condition corresponding to from the top node to the second lower node; and
second priority setting means for setting a display priority for each of the information items in the second list of information items,
wherein the selection screen display controller outputs at least part of the first list of information items so as to be correlated to the first lower node information item, and outputs at least part of the second list of information items so as to be correlated to the second lower node information item,
wherein the first priority setting means sets a lower display priority for information items that satisfy a search condition corresponding to the second lower node, compared to information items that do not satisfy the search condition corresponding to the second lower node, and
wherein the second priority setting means sets a lower display priority for information items that satisfy a search condition corresponding to the first lower node, compared to information items that do not satisfy the search condition corresponding to the first lower node.

17. A method for controlling an information processing device, comprising:
obtaining current node information stored in current node information storage means storing the current node information, the current node information indicating a current node being a node currently selected by a user among nodes in a tree structure of search condition data having the tree structure in which a search condition and a node are correlated with each other;
displaying a selection screen showing a first and second lower node information items on display means, wherein said first and second lower nodes are positioned immediately below the current node; and
displaying a search result screen showing a list of information items satisfying a search condition corresponding to from a top node to the current node, when the user performs a display instructing operation or a lowest node is set as the current node,
obtaining a first list of information items that satisfy a search condition corresponding to from the top node to the first lower node;
setting a display priority for each of the information items in the first list of information items;
obtaining a second list of information items satisfying a search condition corresponding to from the top node to the second lower node;
setting a display priority for each of the information items in the second list of information items; and
outputting at least part of the first list of information items so as to be correlated to the first lower node information item, and outputting at least part of the second list of information items so as to be correlated to the second lower node information item,
wherein, for the first list of information items, a lower display priority for information items that satisfy a search condition corresponding to the second lower node is set, compared to information items that do not satisfy the search condition corresponding to the second lower node, and
wherein, for the second list of information items, a lower display priority for information items that satisfy a search condition corresponding to the first lower node is set, compared to information items that do not satisfy the search condition corresponding to the first lower node.

18. A non-transitory computer readable information storage medium storing a program for causing a computer to function as:
means for obtaining current node information stored in current node information storage means storing the current node information, the current node information indicating a current node being a node currently selected by a user among nodes in a tree structure of search condition data having the tree structure in which a search condition and a node are correlated with each other;
selection screen display control means for displaying a selection screen showing first and second lower node information items on display means, wherein said first and second lower node are positioned immediately below the current node;
search result screen display control means for displaying a search result screen showing a list of information items satisfying a search condition corresponding to from a top node to the current node, when the user performs a display instructing operation or a lowest node is set as the current node;

first obtaining means for obtaining a first list of information items that satisfy a search condition corresponding to from the top node to the first lower node;

first priority setting means for setting a display priority for each of the information items in the first list of information items;

second obtaining means for obtaining a second list of information items satisfying a search condition corresponding to from the top node to the second lower node; and second priority setting means for setting a display priority for each of the information items in the second list of information items, wherein the selection screen display control means outputs at least part of the first list of information items so as to be correlated to the first lower node information item, and outputs at least part of the second list of information items so as to be correlated to the second lower node information item, wherein the first priority setting means sets a lower display priority for information items that satisfy a search condition corresponding to the second lower node, compared to information items that do not satisfy the search condition corresponding to the second lower node, and wherein the second priority setting means sets a lower display priority for information items that satisfy a search condition corresponding to the first lower node, compared to information items that do not satisfy the search condition corresponding to the first lower node.

19. The search system according to claim 1, wherein the search result screen shows a list of product satisfying a search condition corresponding to nodes from the top node to the current node, the selection screen display control means outputs at least part of a first list of products so as to be correlated to the first lower node information item, and outputs at least part of a second list of products so as to be correlated to the second lower node information item.

20. The search system according to claim 1, wherein the at least part of the first list of information items is output in a manner such that the user can realize that the first list of information items is relevant to the first lower node information item, and the at least part of the second list of information items is output in a manner such that the user can realize that the second list of information items is relevant to the second lower node information item.

21. The search system according to claim 20, wherein an image showing correlation between the first list of information items and the first lower node information item and an image showing correlation between the second list of information items and the second lower node information items are output.

22. The search system according the claim 20, wherein the at least part of the first list of information items is output near the first lower node information item, and the at least part of the second list of information items is output near the second lower node information item.

23. The search system according to claim 20, wherein the at least part of the first list of information items is output when an operation is performed with respect to the first lower node information item, and the at least part of the second list of information items is output when an operation is performed with respect to the second lower node information item.

* * * * *